US010333938B2

(12) United States Patent
Pottier et al.

(10) Patent No.: US 10,333,938 B2
(45) Date of Patent: Jun. 25, 2019

(54) METHODS AND RESOURCES FOR CREATING PERMISSIONS

(71) Applicants: ARM IP Limited, Cambridge (GB); ARM Limited, Cambridge (GB)

(72) Inventors: Remy Pottier, Grenoble (FR); Hugo John Martin Vincent, Cambridge (GB); Amyas Edward Wykes Phillips, Cambridge (GB); Christopher Mark Paola, Cambridge (GB); Milosch Meriac, Cambridge (GB)

(73) Assignees: ARM Limited, Cambridge (GB); ARM IP Limited, Cambridge (GB)

( * ) Notice: Subject to any disclaimer, the term of this patent is extended or adjusted under 35 U.S.C. 154(b) by 158 days.

(21) Appl. No.: 15/001,750

(22) Filed: Jan. 20, 2016

(65) Prior Publication Data
US 2016/0212137 A1 Jul. 21, 2016

(30) Foreign Application Priority Data

Jan. 21, 2015 (GB) .................................. 1501027.5

(51) Int. Cl.
H04L 29/06 (2006.01)
(52) U.S. Cl.
CPC ........ *H04L 63/101* (2013.01); *H04L 63/0823* (2013.01); *H04L 63/104* (2013.01)
(58) Field of Classification Search
CPC .. H04L 63/101; H04L 63/104; H04L 63/0823
See application file for complete search history.

(56) References Cited

U.S. PATENT DOCUMENTS

| 6,601,171 | B1 | 7/2003 | Carter et al. |
| 9,094,407 | B1* | 7/2015 | Matthieu ................. H04L 63/10 |
| 2004/0010603 | A1 | 1/2004 | Foster et al. |
| 2004/0083386 | A1 | 4/2004 | Marquet et al. |
| 2007/0282897 | A1* | 12/2007 | Hamilton ............... G06Q 10/06 |
| 2008/0104393 | A1* | 5/2008 | Glasser ............... G06F 21/6218 713/165 |
| 2008/0313712 | A1 | 12/2008 | Ellison et al. |
| 2010/0005312 | A1 | 1/2010 | Rom et al. |

(Continued)

FOREIGN PATENT DOCUMENTS

WO WO 2016/055766 A1 4/2016

OTHER PUBLICATIONS

Vincent Hu et al., "Access Control Policy Verification," IEEE, 2016, pp. 80-83 (Year: 2016).*

(Continued)

*Primary Examiner* — Luu T Pham
*Assistant Examiner* — Canh Le
(74) *Attorney, Agent, or Firm* — Patterson Thuente Pedersen, P.A.

(57) ABSTRACT

A method of creating, at a permissions management resource, access permissions relating to a subject device for at least one data processing device, the method comprising: obtaining, at the permissions management resource, input data; generating, at the permissions management resource, at least one permission relating to accessing the subject device in response to the input data; transmitting, from the permissions management resource to the subject device and/or the at least one processing device, a communication comprising the at least one permission.

17 Claims, 12 Drawing Sheets

(56) References Cited

U.S. PATENT DOCUMENTS

| | | | | |
|---|---|---|---|---|
| 2013/0073854 | A1* | 3/2013 | Patti | H04L 9/0825 |
| | | | | 713/171 |
| 2013/0254535 | A1* | 9/2013 | Akehurst | H04L 29/06 |
| | | | | 713/158 |
| 2014/0047487 | A1* | 2/2014 | Guedalia | H04W 4/70 |
| | | | | 725/80 |
| 2014/0244836 | A1* | 8/2014 | Goel | H04W 4/08 |
| | | | | 709/224 |
| 2014/0244997 | A1* | 8/2014 | Goel | H04W 12/08 |
| | | | | 713/155 |
| 2016/0112240 | A1* | 4/2016 | Sundaresan | H04W 4/90 |
| | | | | 726/1 |
| 2016/0112870 | A1* | 4/2016 | Pathuri | H04L 63/104 |
| | | | | 726/4 |
| 2016/0112980 | A1* | 4/2016 | Pai | H04W 12/08 |
| | | | | 455/435.1 |
| 2016/0187961 | A1* | 6/2016 | Elibol | G06F 1/3293 |
| | | | | 713/323 |

OTHER PUBLICATIONS

Dina Hussein et al., "A Community-Driven Access Control Approach in Distributed IoT Environments," IEEE Communication Magazine, Mach 2017, pp. 146-153. (Year: 2017).*

Search Reported dated Jul. 14, 2015 for GB Application No. 1501027.5, 4 pages.

Kerberos (protocol) From Wikipedia, the free encyclopedia, http://en.wikipedia.org/wiki/Kerberos_(protocol), as accessed on Apr. 19, 2017, 8 pages.

Extended Access Control From Wikipedia, the free encyclopedia, http://en.wikipedia.org/wiki/Extended_Access_Control, as accessed on Apr. 19, 2017, 3 pages.

* cited by examiner

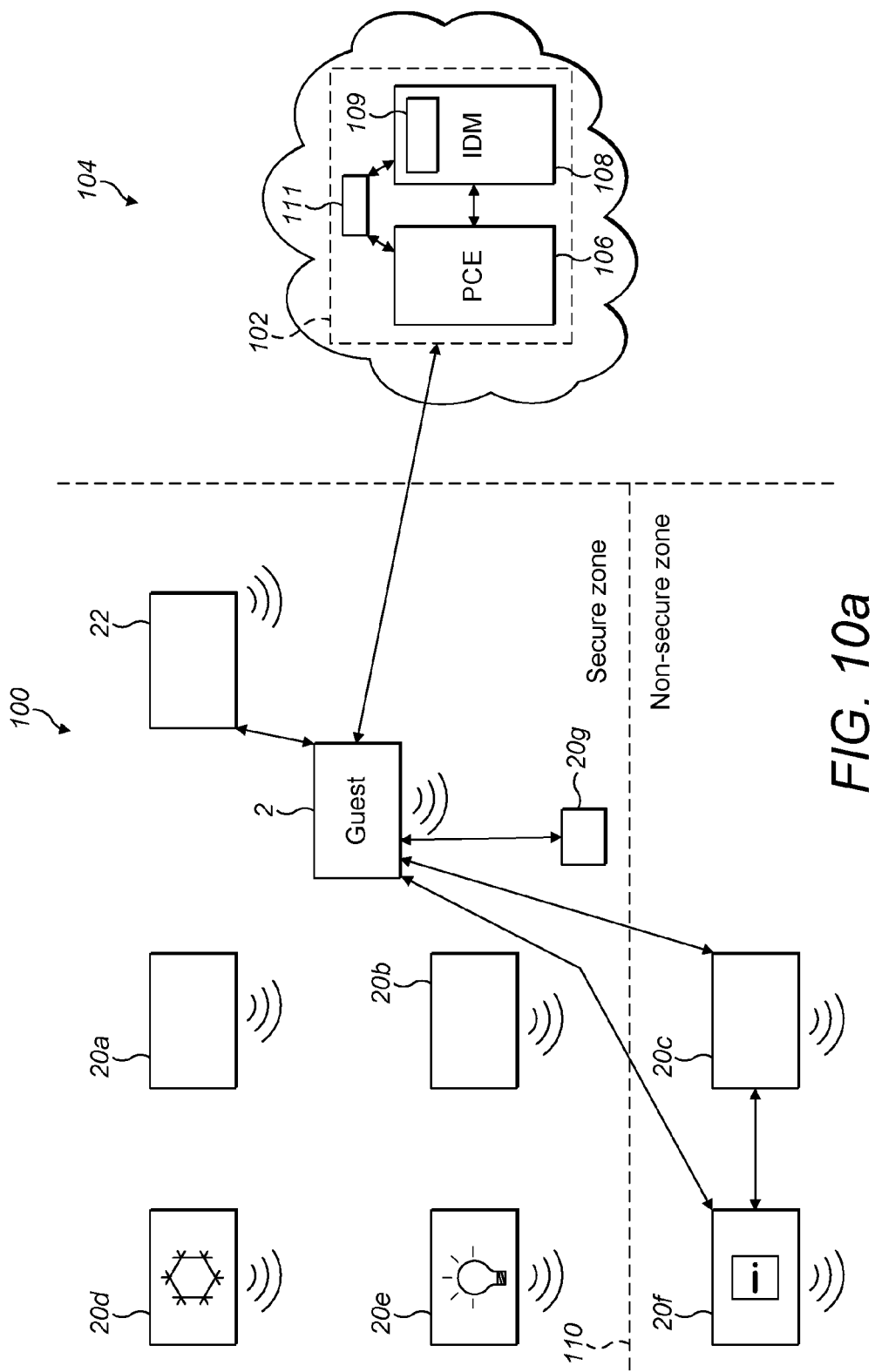

METHODS AND RESOURCES FOR CREATING PERMISSIONS

RELATED APPLICATION

The present application claims priority to GB Application No. 1501027.5 filed Jan. 21, 2015, which is hereby incorporated herein in its entirety by reference.

TECHNICAL FIELD

The technical field relates to data processing devices and in particular to creating permissions and managing permissions for data processing devices.

BACKGROUND ART

There are ever increasing numbers of devices within the home, other buildings or the outdoor environment that have processing and communication capabilities which allow them to interact with other processing devices.

Everyday objects and relatively small scale data processing devices, hereinafter "subject devices" may be connected to each other and to central resources as part of the "Internet of Things" (IoT).

For example, a temperature hub in a home environment may gather information from various subject devices, such as temperature sensors around the home, and control the activation of heaters/air conditioning units based on the gathered information. Furthermore, the subject devices may generate information thereon, e.g. information relating to energy usage, efficiency, which may be sent to a cloud service and accessed by an interested party e.g. via a web application.

Furthermore, a subject device, such as an entry sensor in a smart-door, may gather authorization information from a data processing device in communication therewith and control the activation of an associated door lock based on the authorization information. The subject device may generate information thereon e.g. information relating to entry attempts, which may be sent to a cloud service to be accessed by a party.

However, since many subject devices have little processing capability, and may only have intermittent network connectivity or connectivity with high latency, due to energy or connectivity constraints, establishing a trusted relationship with other data processing devices remote therefrom can be difficult and may significantly increase the cost and complexity of the IoT and/or data processing devices.

The present techniques seek to address these problems.

BRIEF DESCRIPTION OF THE DRAWINGS

FIG. 10a schematically shows the guest data processing device of FIG. 6 in a network communicating with a plurality of subject devices;

FIG. 11b schematically shows the plurality of data processing devices in a network communicating with the permission management infrastructure of FIG. 11a.

DETAILED DESCRIPTION

Figure 1:
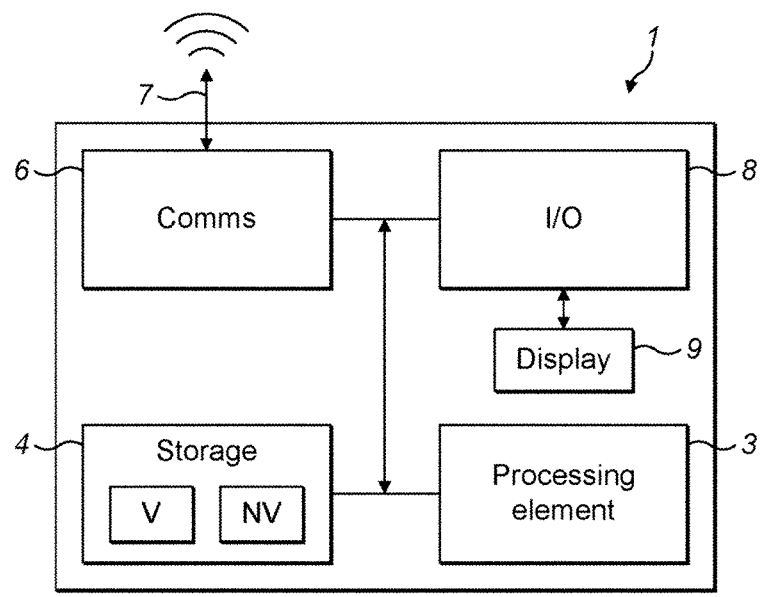
FIG. 1 schematically shows an example of a data processing device for use with the present techniques.

FIG. 1, schematically shows an example of a data processing device 1 for use with the present techniques. In the present examples, the data processing device 1 may comprise credentials relating to an authorized party associated with the data processing device 1 (e.g. an owner), which may be used to verify the identity of the owner to other resources remote therefrom e.g. data processing devices, applications running on remote devices, cloud platforms, directories etc.

The data processing device 1, which may comprise credentials, hereinafter "envoy device" may also be capable of running applications to process data received from any such remote resources in order to access, interact with and/or verify the identity and/or to take ownership thereof on behalf of the owner.

Furthermore, the envoy device 1 may be capable of defining permissions associated with data processing devices which the owner has taken ownership of, and communicating such permissions to any such data processing device.

As illustrated in FIG. 1, the envoy device 1 may comprise a processing element 3 coupled to a storage element 4, comprising, for example memory circuitry (volatile memory (V) & non-volatile memory (NV), such as such as flash and ROM). The memory circuitry 4 may store programs executed by the processing element 3.

In the present example, a non-volatile memory region (NV) may be both read from and written to, but for which read and/or write protection may be applied so that a protected region (not shown) of NV can only be accessed by privileged software executed by the processing element 3. The protected region may store confidential information such as device identifiers, cryptographic keys, certificates, e.g. comprising permissions such as an access control list (ACL) therein.

In the present example, the protected region may also comprise a device identifier, such as a unique device identifier which uniquely identifies the envoy device 1. The unique device identifier may take any suitable form, and may for example be a semantic identifier defined by an owner, an IPv6 address, IPv4 address, serial number, Universally Unique Identifier (UUID) or Globally Unique Identifier (GUID) etc.

The envoy device 1 also comprises communication circuitry 6 for communicating with remote data processing devices/resources (not shown in FIG. 1). The communication circuitry 6 may use a wireless communication 7, such as, for example, wireless local area network (WiFi), short range communication such as radio frequency communication (RFID), near field communication (NFC) or communications used in wireless sensor networks such as ZigBee, Bluetooth and/or Bluetooth Low energy (BLE). Also the communication circuitry 6 may use a cellular network such as 3G or 4G. The communication circuitry 6 may also, in some examples, use wired communication such as a fibre optic or metal cable (not shown). The communication circuitry 6 could also use two or more different forms of communication, such as several of the examples given above in combination.

The envoy device 1 may also comprise input/output (I/O) circuitry 8 such as a user interface (UI) (e.g. buttons) to allow the owner to interact with the envoy device 1. Furthermore, the envoy device 1 may comprise a display 9 e.g. an organic light emitting diode (OLED) display, for communicating messages to the owner. The display may also be a touch screen to receive inputs from the owner.

Although, the envoy device 1 may comprise large scale data processing devices such as a tablet computer, often the envoy device 1 comprises a relatively small scale data processing device such as a smartphone or a wearable data processing device, for example a smart-watch.

It will be appreciated that the envoy device 1 may comprise other hardware/software components not described herein depending on the specific function of the envoy device 1. For example, in the case of a smart-watch, the envoy device 1 may comprise a global positioning system (GPS) to capture and record movement, and to generate operational data accordingly.

Figure 2:
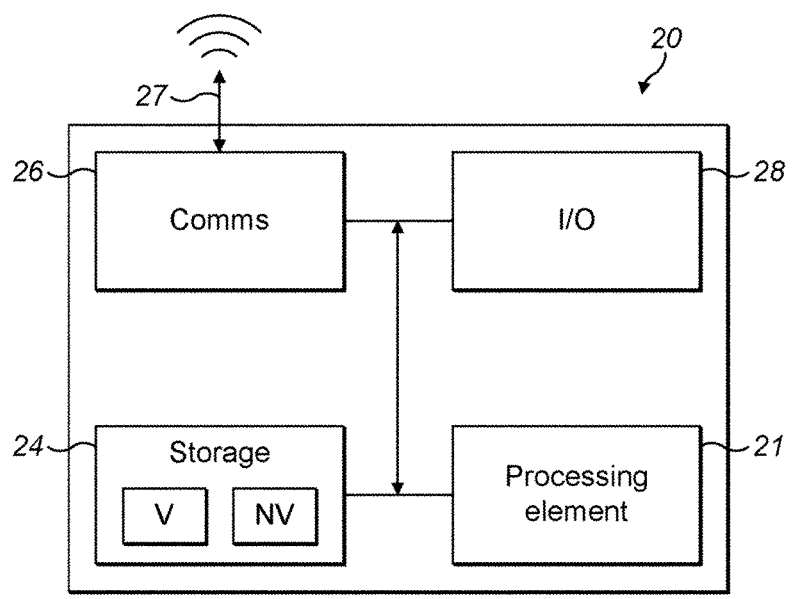
FIG. 2 schematically shows an example of a subject device which can communicate with the data processing device of FIG. 1.

FIG. 2 schematically shows an example of a subject device 20 which can communicate with an envoy device using the present techniques.

The subject device 20 may be any device which gathers data for transmitting to a remote resource (e.g. the envoy device 1, web application), which may verify credentials received from a remote resource and/or which may be accessed by a remote resource. For example, the subject device 20 may be a connected device in the Internet of Things (IoT) such as a wireless sensor or actuator.

In the present illustrative example, the subject device 20 comprises a processing element 21, and storage element 24, comprising, for example memory circuitry 24 (e.g. volatile memory (V) and/or non-volatile memory (NV), such as such as flash and ROM).

The memory circuitry 24 may store programs executed by the processing element 21.

In the present example, the memory circuitry 24 comprises a NV memory region which can be both read from and written to, but for which read and/or write protection may be applied so that the protected region (not shown) of NV can only be accessed by privileged software executed by the processing element 21. The protected region may store confidential information, for example cryptographic keys, ACLs or certificates received from a resource remote therefrom, such as an envoy device 1, or a cloud service.

In the present example, the protected region also comprises a device identifier, such as a unique device identifier which uniquely identifies the subject device 20. The unique device identifier may take any suitable form, for example as described above.

The memory circuitry 24 may also comprise further device identifiers which correspond to attributes associated with the subject device 20.

For example, device type identifiers may provide further information about the subject device 20, whereby the device type identifiers may include, for example, a device manufacturer identifier (e.g. 'Made_by_CompanyY'), an owner identifier (e.g. 'Owner_is_Alice'), a device class identifier (e.g. 'temperature_sensor'), and/or a device location identifier (e.g. 'living_room').

Furthermore, device capability identifiers may provide information relating to the specific functionality of the subject device such as, for example a text description of the device functionalities e.g. 'Subject device can measure temperature', 'Subject device can authorise received credentials and unlock connected doors,' 'Subject device can publish data on the Internet via web applicationXYZ'.

The device identifiers may also comprise data type identifiers relating to the type of data generated by the device. For example, in the case of a temperature sensor, the data type may be classified as 'low_sensitive_data,' while in the case of an entry sensor, the data type may be classified, for example as 'high_sensitive_data' or 'secret_data'.

The device identifiers may be hierarchical in form, whereby, a device identifier may have different levels associated therewith.

As an illustrative example, in the case of a device location identifier located in a user's kitchen, the location identifier may comprise multiple levels 'house/downstairs/kitchen.'

As a further illustrative example of a device location identifier having multiple levels, a device belonging to a company may comprise the device location identifier 'CompanyY_HeadQuarters/Building6/2ndFloor/Office8'

As a further example, a device class identifier may take the hierarchical form, to provide multiple levels of device class identifier. As an illustrative example, a temperature sensor in a house may comprise the device class identifier: 'household_appliance/sensor/temperature_sensor', while an entry sensor may, for example, comprise the device class identifier 'security_appliance/sensor/entry_sensor'.

It will be appreciated that while certain device identifiers may be permanently written to memory on a subject device e.g. at manufacture, such as the device class identifier (e.g. sensor/temperature_sensor) device manufacturer identifier ('Made by ACMESensor's Ltd'), and/or the unique device identifier (e.g. an IPv6 address), an authorized party e.g. an owner, may set other device identifiers, or add hierarchical levels to the device identifiers.

For example, in a home environment, the owner may set whether the subject device should be designated a 'security_appliance' or a 'household_appliance', who the owner is, and/or the owner may classify the type of data generated by the device e.g. 'high_sensitive_data' or 'low_sensitive_data'.

The owner may, for example, set the device identifiers via an application running on an envoy device in communication with the subject device.

Therefore, it will be appreciated that in addition to providing information relating to device attributes, the device identifiers may also provide contextual information relating to how the owner intends to use the device.

The subject device 20 may also comprise communications circuitry 26 for communicating with remote data processing devices and/or resources, such as envoy devices, or cloud services, to receive requests/commands/credentials/permissions (e.g. in an ACL) therefrom or to push data thereto. Such communications circuitry 26 may include wireless communications 27 e.g. BLE, Bluetooth, ZigBee, WiFi, and/or cellular 3G/4G.

The subject device 20 may further comprise I/O circuitry 28, such as sensing circuitry to sense inputs from the surrounding environment to generate operational data and/or to provide an output to control an operation of the subject device 20 e.g. to control a transistor to determine the operation of a buzzer, a light emitting diode(s) or a relay (not shown).

For example, the subject device 20 may be a smart-lightbulb comprising an array of LEDs, whereby an owner may control the emission the LEDs via an application running on a remote device.

Alternatively, the subject device 20, may be an embedded device such as a healthcare monitor, which generates operational data related to its owner's health such as heart rate, blood sugar level and/or temperature and sends the operational data to a remote server for processing of the operational data, which may then be accessed by the owner, or a select group of users authorized to access the operational data by the owner.

Alternatively, the subject device 20 may be an embedded temperature sensor, which generates operational data based on the temperature of the surrounding environment, and publishes the operational data on a web application on behalf of its owner.

Alternatively, the subject device 20 may be a smart fridge, which detects, for example, the date of expiry on foodstuff therein and alerts the owner via an application running on the owner's smart-phone if any food is approaching expiry.

Alternatively, the subject device 20 may be an entry sensor on a smart door, which is operable to lock/unlock the door based on communications received from a data processing device.

Alternatively, the subject device 20 may be a wearable device, for example a fitness band which generates data relating to movement, for example capturing distance walked/run/swam, or elevation ascended/descended.

Alternatively, the subject device 20 may be a smart-pen, configured to generate operational data relating to the specific movement of the pen, for example alphanumeric characters or pictures. The subject device 20 may also be configured to create files such as JPEG/Vector (e.g. SVG)/Portable Document Format (PDF) recording the specific movements, and to send the data to a remote server for processing of the operational data.

It will be appreciated that subject devices listed above are by way of example only. It will further be appreciated that subject devices may comprise other hardware/software components not described herein depending on the specific function of the subject device.

Furthermore, while an envoy device as described above may be capable of providing similar functionalities as a subject device, in that an envoy device may sense inputs, process data, and communicate with resources remote therefrom, it will be appreciated that envoy devices will generally have increased processing capabilities in comparison to subject devices, and be capable of providing increased functionalities and greater interaction with a user in comparison to subject devices. For example, as described above, the envoy device may comprise a mobile phone or a smart watch, with which a user can interact, e.g. via a plurality of applications running thereon.

Figure 3:
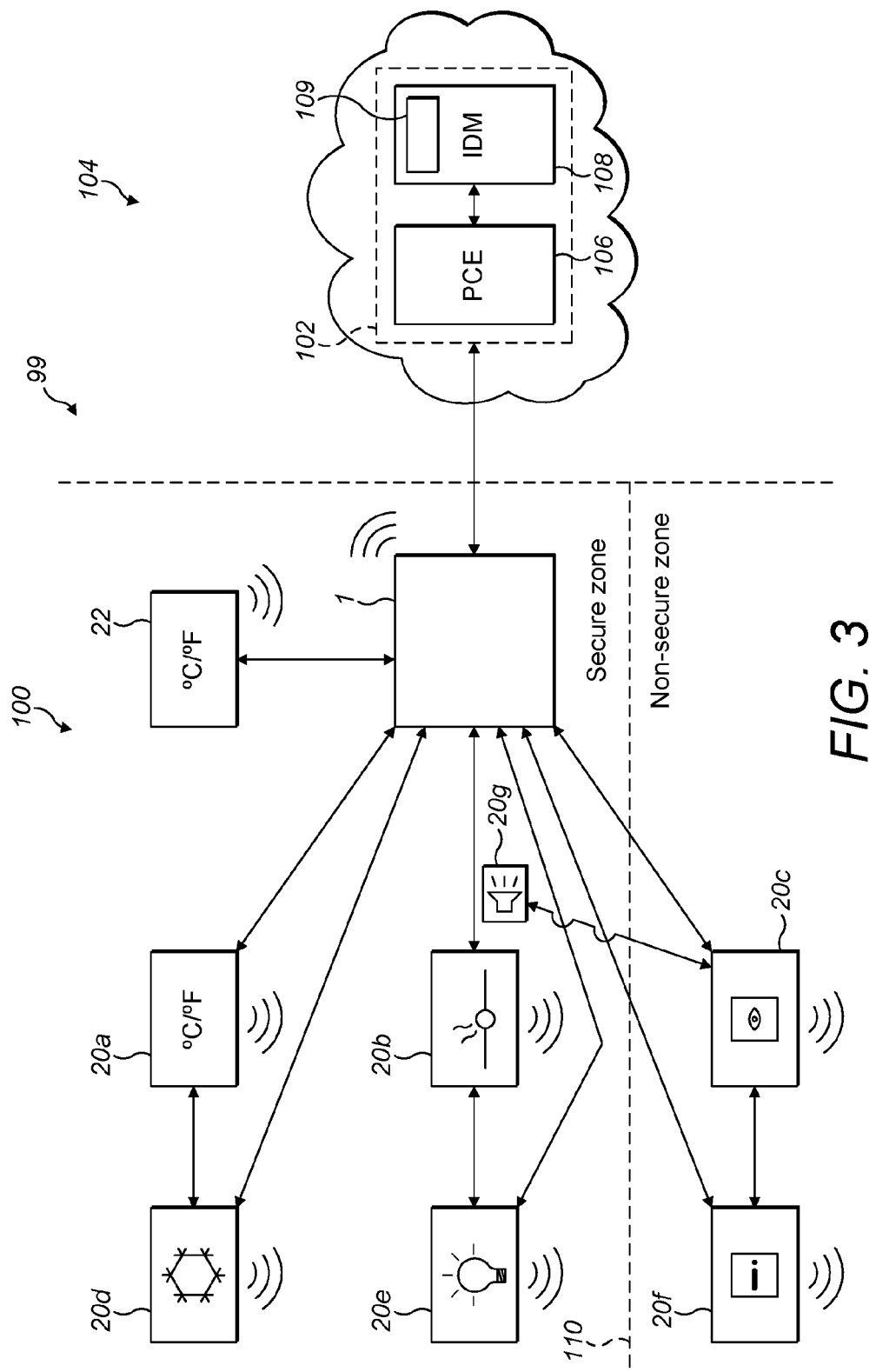
FIG. 3 schematically shows the data processing device of FIG. 1 in a network.

FIG. 3 schematically illustrates an example of a system 99 comprising envoy device 1 communicating with a plurality of subject devices 20a-20g in a local network 100 (e.g. within a home network or office environment); whereby the envoy device 1 is in communication with a permissions management resource 102 remote therefrom, whereby the permissions management resource 102 is configured to manage the generation and distribution of commands, credentials and/or permissions for data processing devices (e.g. the envoy devices/subject devices).

In the following illustrative examples, the permissions management resource 102 is described as a cloud platform on an external network 104 (e.g. the internet), in communication with envoy devices/subject devices located in a local network 100 (e.g. a mesh network). However, the permissions management resource 102 is not limited to being a cloud platform, and may be provided as a data processing device within the local network 100, or an application running thereon.

In the present examples, the envoy device 1 is taken to belong to an owner of the subject devices 20a-20g, i.e. a party who is authorized, for example, to have unrestricted access to the subject devices e.g. to configure/set permissions/control the subject device.

The envoy device 1 may communicate with the subject devices 20a-20g using any suitable communications protocol (e.g. Bluetooth/BLE/ZigBee), while the envoy device 1 may communicate with the permissions management infrastructure 102 using any suitable communications protocol (e.g. BLE, ZigBee, WiFi, cellular 3G/4G).

The envoy device 1 may also communicate with the permissions management resource 102 using intermediate devices such as routers (e.g. border routers/Internet Service Provider (ISP) routers).

The subject devices may also communicate with each other, to control the functionality thereof (e.g. via BLE, Zigbee, wired etc.), whist the subject devices may also communicate with the permissions management infrastructure 102 directly (e.g. via WiFi, cellular 3G/4G) using intermediate devices as required, or indirectly e.g. via envoy device 1 or a further data processing device.

In the following examples the permissions management resource is depicted as a permissions management infrastructure 102 on the cloud comprising a data processing engine 106 (e.g. software running on a server located on the cloud), hereinafter referred to as a permission creation engine (PCE) 106, which is configured to generate permissions for resources such as data processing devices (e.g. envoy devices, subject devices), applications and/or system processes, whereby the generated permissions may be defined by an owner of the resource at the permissions management infrastructure 102 e.g. via an application running on the owner's envoy device 1 or on another data processing device in communication with the permissions management infrastructure 102. The permissions defined by the owner may then be generated at the permissions management infrastructure 102 using PCE 106.

For example the owner may define what functions a particular subject device is permitted to undertake, or where a subject device should publish information on behalf of its owner. Additionally or alternatively, the owner may define the amount of access a guest device is permitted to have with respect to the features and/or functionality of one or more subject devices, and the owner may also define the limits of any such access and/or the duration thereof.

Additionally or alternatively, permissions may be automatically generated by the PCE 106 based on an analysis of input data comprising rules/policies (predefined or customized by an authorized party), contextual data and/or guest identity. Such functionality is described in greater detail with relation to FIGS. 9 and 10).

The permissions management infrastructure 102 may also comprise identity management engine (IDM) 108 (e.g. software running on a server located on the cloud), which is configured to manage the permissions generated at the PCE 106, e.g. by distributing the permissions to one or more data processing devices (e.g. a subject device and/or envoy devices) so the permissions can be implemented on the data processing devices.

In the present examples, the generated permissions comprise an access control list (ACL), whereby an ACL may define the functionality which the subject device is authorized to undertake.

For example, according to an example ACL, a subject device may be configured to control other subject devices e.g. an entry sensor may be permitted to unlock a door or to activate an alarm, while a temperature sensor may be permitted to adjust the output of an air-conditioning unit. In a further example, an ACL may specify the location of a web page or a server to which any operational data generated by a subject device should be pushed.

As an illustrative example, an ACL may specify whether any data processing devices are authorized to access features/functionality of a subject device. For instance, a subject device may be provided with an ACL which contains the instructions:

'Guest_Device_X: read, write—file A; and
Guest_Device_Y: read—file B'

Therefore a subject device having such an ACL may permit 'Guest Device X' to read and write from/to the file A on the subject device, while the ACL may permit 'Guest Device Y' to only read from file B on the subject device.

Additionally or alternatively, the ACL may comprise a list of specific permissions relating to activities which the owner permits a guest device to undertake, e.g.

'Guest device X: read, write—File A: Monday to Friday 0900-1700; and
Guest device Y—read file B Tuesday to Thursday'

Additionally or alternatively, an ACL may have an expiration period, after which the ACL is no longer valid. For example, an ACL on a subject device may be valid for a period of 24 hours, whereby a guest device may be permitted to access the subject device during the period the ACL is valid, but whereby the guest device will not be able to access the subject device after that period, and will have to request an updated ACL.

Furthermore, a subject device may utilise a blacklist of permissions, which, for example, may comprise an ACL comprising details of functions prohibited to be performed by the subject device (e.g. do not generate data after 1900 hrs).

Additionally or alternatively, the blacklist of permissions may comprise details (e.g. device identifiers, public keys, network addresses) of data processing devices/applications/resources prohibited from accessing the subject device.

The owner may, via envoy device or another data processing device, define the details and/or functions to be included within the blacklist, and may further define which subject devices should implement the blacklist. The PCE 106 may then generate the blacklist, while the IDM 108 may communicate the blacklist to the subject devices directly or indirectly.

Such functionality allows the owner to prevent unauthorized access to subject devices, for example by rogue 3$^{rd}$ parties.

In the illustrative example schematically shown in FIG. 3, subject devices 20a-g, are owned by the same owner, which also owns envoy device 1, whereby:

Subject device 20a is depicted as a temperature sensor configured to detect the temperature of the surrounding environment and to generate operational data based on the sensed temperature.

Subject device 20b is depicted as a light sensor 20b configured to detect levels of light in the surrounding environment, and to generate operational data based on the sensed levels.

Subject device 20c is depicted as an entry sensor 20c, configured to communicate with other data processing devices and to determine the authorization of such devices.

Subject device 20d is depicted as an air conditioning unit 20d, having functionality (e.g. heat/cool output), which may be controlled by a data processing device in communication therewith.

Subject device 20e is depicted as a smart lightbulb, having functionality (e.g. on/off, dimming), which may be controlled by a data processing device in communication therewith.

Subject device 20f is depicted as a smart door lock, having functionality (e.g. lock/unlock), which may be controlled by a data processing device in communication therewith.

Subject device 20g is depicted as a smart alarm having functionality (e.g. sound buzzer) which may be controlled by a data processing device in communication therewith.

In the present example, the temperature sensor 20a, air conditioning unit 20d, light sensor 20b and lightbulb 20e and alarm 20g are considered to be part of a secure zone within network 100 (e.g. within the interior of an owner's home), while the entry sensor 20c and door lock 20f are considered to be part of a non-secure zone within the local network 100 (e.g. at the exterior of the owner's home), with the boundary between secure and non-secure zones depicted as 110. It will be appreciated that, in some examples, the boundary 110 may not necessarily be a physical boundary.

As before, the owner may, via an application running on the envoy device 1, set permissions at the PCE 106 for each of the subject devices 20a-g. The PCE 106 may generate an ACL corresponding to the permissions set by the owner, whereby any ACL is transmitted to the subject devices by IDM 108 directly (e.g. via WiFi) or indirectly e.g. via envoy device 1, whereby the ACL will be implemented thereon.

For example, the owner may set permissions at the PCE 106 to instruct the temperature sensor 20a to push all operational data generated thereon to a specific web service on the internet. Additionally or alternatively, the permissions may relate to communicating with another data processing device, whereby, for example, the owner instructs the temperature sensor 20a to send operational data to the air conditioning unit 20d.

Furthermore, the owner may also set permissions for the air conditioning unit 20d at the PCE, whereby, for example, the owner instructs the air conditioning unit 20d to accept operational data from the temperature sensor 20a, and perform an action accordingly, such as "maintain temperature at 19° C.", "power off between 0101 and 0830."

Therefore, in the example above, the temperature sensor 20a will generate operational data and send the operational data to the air conditioning unit 20d. As the air conditioning unit 20d is permitted to receive data from the temperature sensor 20*a*, the operational data will be processed and the output of the air conditioning unit 20*d* adjusted according to the instructions in the ACL.

As a further illustrative example, the owner may set permissions at the PCE 106 to allow the light sensor 20*b* to push all operational data generated thereon to a web service on the cloud for access by any interested party. The PCE 106 will generate an ACL corresponding to the permissions set by the owner, whereby the ACL is transmitted to the light sensor 20*b* by IDM 108, e.g. via envoy device 1.

As a further illustrative example, the owner may set permissions at the PCE 106 to allow the entry sensor 20*c* to authorise access to certain guests (e.g. as described below) and on authorizing the guests to push all operational data generated thereon (e.g. capturing the date and time and guest identification) to a web service on the cloud for access by the owner.

Additionally or alternatively, the permissions may relate to communicating with another data processing device(s), whereby, for example, the owner instructs the entry sensor 20*c* to send command instructions to the air conditioning unit 20*d*, light bulb 20*e*, door lock 20*f* and or smart alarm 20*g* based on the operational data.

Furthermore, the owner may also set permissions for the air conditioning unit 20*d*, lightbulb 20*e*, door lock 20*f* and/or smart alarm 20*g* at the PCE based on instructions received from the entry sensor 20*c*, whereby, for example, the owner instructs the air conditioning unit 20*d*, lightbulb 20*e* and door lock 20*f* to perform respective actions, such as for example:

For the door lock—"if instructed by entry sensor—open door";
For the air conditioning unit—"if instructed by entry sensor—power on and maintain 19° C.";
For the smart lightbulb—"if instructed by entry sensor—turn on"; and/or
For the smart alarm—"if instructed by entry sensor—activate buzzer"

Therefore, in the example above, the entry sensor 20*a* will authorise a guest to enter the house and, on doing so, may instruct the door lock 20*f* to unlock, the air conditioning unit 20*d* to turn on and maintain 19° C., and/or instruct the light bulb 20*e* to turn on.

Alternatively, if a guest in not authorized to enter the house, the entry sensor may instruct the smart alarm 20*g* to activate the buzzer, and instruct the lightbulb 20*e* to turn on.

Therefore, it will be appreciated that the owner may, using the permissions management infrastructure 102, define the permissions for a particular subject device and manage the implementation of the permissions on the subject devices. The PCE 106 may generate an ACL specifying the permissions set by the owner, whereby the IDM 108 may manage the distribution of the ACLs to the respective subject devices, whereby the subject devices are configured to perform the operations specified in the ACLs.

As will be appreciated, the permissions may be transmitted directly to the subject devices from the permissions management infrastructure 102. Therefore, using such functionality, the subject devices may be required to have a constant network connection to receive the ACLs.

Alternatively, the permissions may be transmitted to the subject devices indirectly e.g. via the owners envoy device 1 or a data processing device. In such a case the envoy device 1 may receive the ACL from the IDM 108 and transmit the ACL to the to the subject device when in proximity thereto, e.g. using BLE. Using such functionality, the subject device is not required to have a constant network connection, and can receive any permissions locally over a suitable communications protocol.

The subject devices may verify that the permissions are transmitted thereto by an authorized device and/or resources using any suitable verification protocol. For example, cryptographic keys (e.g. symmetric/asymmetric keys) may be used for verification purposes. Such keys may be 128-bit or 256-bit AES (Advanced Encryption Standard) keys or elliptic curve cryptography (ECC) keys.

For example, when using asymmetric keys, the subject devices 20*a*-20*g* may comprise a public key of the owner $Puk_{(Owner)}$ and/or the public key of the permissions management infrastructure $Puk_{(PMI)}$ stored in memory thereon.

The public keys may be provided to the subject devices during a registration process between the owner and the respective subject devices, e.g. using the owner's envoy device 1, whereby the subject devices may recognise any public keys provided thereto during the registration process as being associated with its owner, or a party authorized by its owner to interact therewith. Furthermore, a subject devices may also send the owner its public key e.g. during the registration process.

Therefore, the owner and/or permissions management infrastructure 102 may sign the ACL with their respective private keys before sending the ACL to the subject device, and, before implementing the ACL, the subject device may verify that the ACL is from an authorized party by verifying the signature using the corresponding public key(s).

Furthermore, the owner, may send a description of any subject devices which it has taken ownership of to the permissions management infrastructure 102, such that the permissions management 102 is aware of the subject devices. The description of ownership may comprise the device identifiers of the respective subject devices and or the respective public keys thereof.

It will be appreciated that as the owner and/or the permissions management infrastructure comprise the public key $Puk_{(Subject)}$ of the subject device, communications from the envoy device 1/permissions management infrastructure 102 may be encrypted using the public key $Puk_{(Subject)}$ of the subject device to which permissions are to be sent, whereby the subject device can decrypt the communications using the corresponding private key $Prk_{(Subject)}$.

Figure 4:
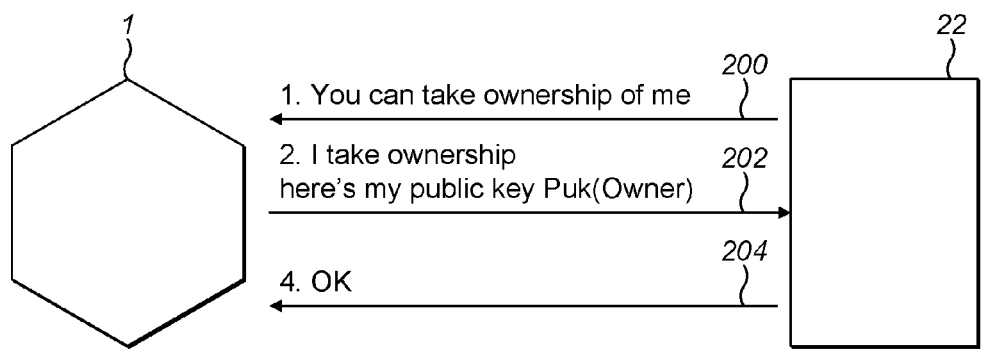
FIG. 4 schematically shows the data processing device of FIG. 1 communicating with a subject device to take ownership thereof.

The owner may also add new subject devices to the network and take ownership thereof. As shown in the illustrative example of FIGS. 3 and 4, on powering on a new subject device 22 (which is depicted as a $2^{nd}$ temperature sensor), the new subject device 22 may broadcast its attributes (e.g. device identifiers) and broadcast it's availability for an owner to take ownership thereof (as shown at Step 200 FIG. 4).

The owner may, via an application running on the envoy device 1, take ownership of the new subject device 22, whereby for example, a credential associated with the owner and/or an authorized party is communicated to the subject device 22 and stored in memory circuitry provided thereon, whereby the credential is taken to be that of the owner.

In the present example, the credential is a public key ($Puk_{(Owner)}$) of an asymmetric key pair of the owner, whereby $Puk_{(Owner)}$ is received by the new subject device 22 and stored in a protected region of memory thereat, and taken to be the public key of its owner (Step 202). The new subject device 22 may transmit a communication to the envoy device 1 to confirm receipt of the credential and that the owner has taken ownership thereof (Step 204). As above, such a communication may comprise the device identifiers of the subject device 22. Furthermore, the owner, may send a description of ownership to the permissions management infrastructure 102, such that the permissions management 102 is aware of the subject device 22.

The corresponding cryptographic key e.g. a private key ($Prk_{(Owner)}$) of the owner may be stored within the protected region at the envoy device 1. In some examples, the private key ($Prk_{(Owner)}$) may be communicated to the permissions management infrastructure 102 and stored thereat e.g. at a protected region 109 of the IDM 108. The private key $Prk_{(Owner)}$ may be provided to the permissions management infrastructure 102 during a registration process between the owner and permissions management infrastructure 102.

As before, the new subject device 22 may comprise device identifiers provisioned thereon at manufacture and/or which are set by the owner on taking ownership of the new subject device 22 e.g. via an application.

Figure 5:
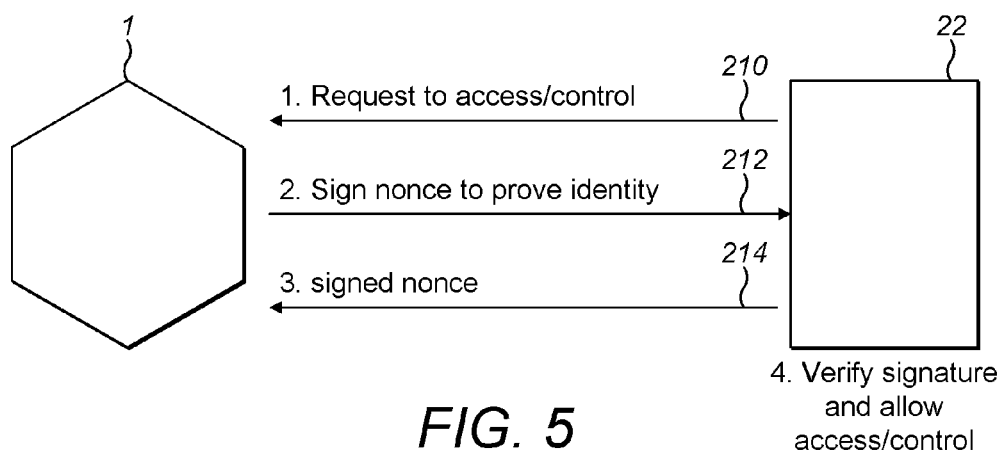
FIG. 5 schematically shows the data processing device of FIG. 1 communicating with a subject device to access features of the subject device.

FIG. 5 shows an example of an owner interacting with the new subject device 22 using envoy device 1. Having taken ownership of the new subject device 22, the owner may be able to access the new subject device 22 using the envoy device 1.

At step 210 the owner may, via envoy device 1, request to access the new subject device 22.

At step 212, the new subject device 22 may generate and transmit a communication comprising a cryptographic nonce to the envoy device 1, whereby the envoy device 1 signs the nonce with the owner's private key ($Prk_{(Owner)}$).

At step 214, the signed nonce is transmitted to the new subject device 22, which verifies the signature using the owner's public key ($Puk_{(Owner)}$) stored thereon, whereby, on verification of the signature, the envoy device 1 is granted access to the new subject device 1 (Step 216).

Figure 6:
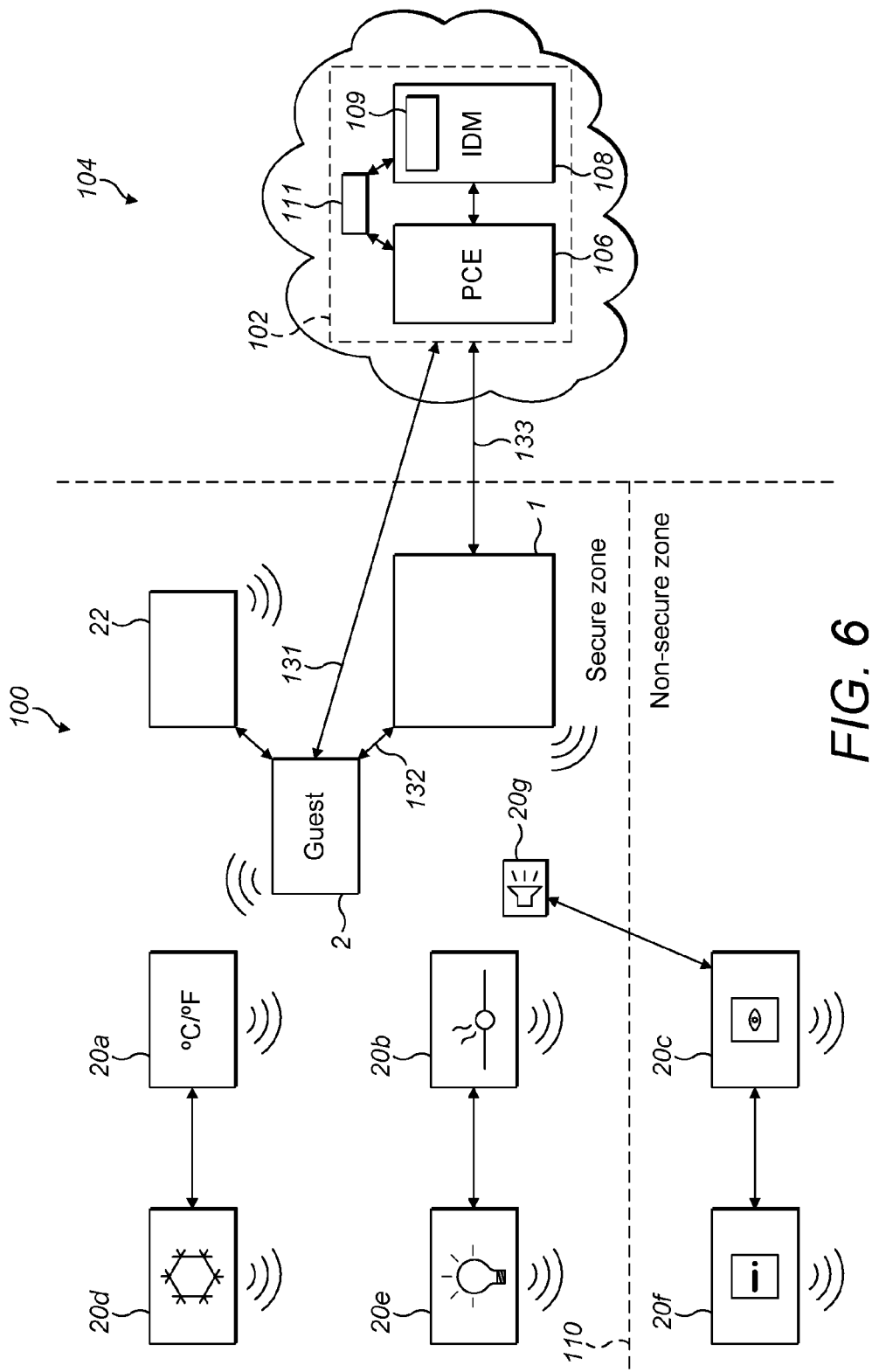
FIG. 6 schematically shows a guest data processing device in a network communicating with a subject device.
Figure 7A:
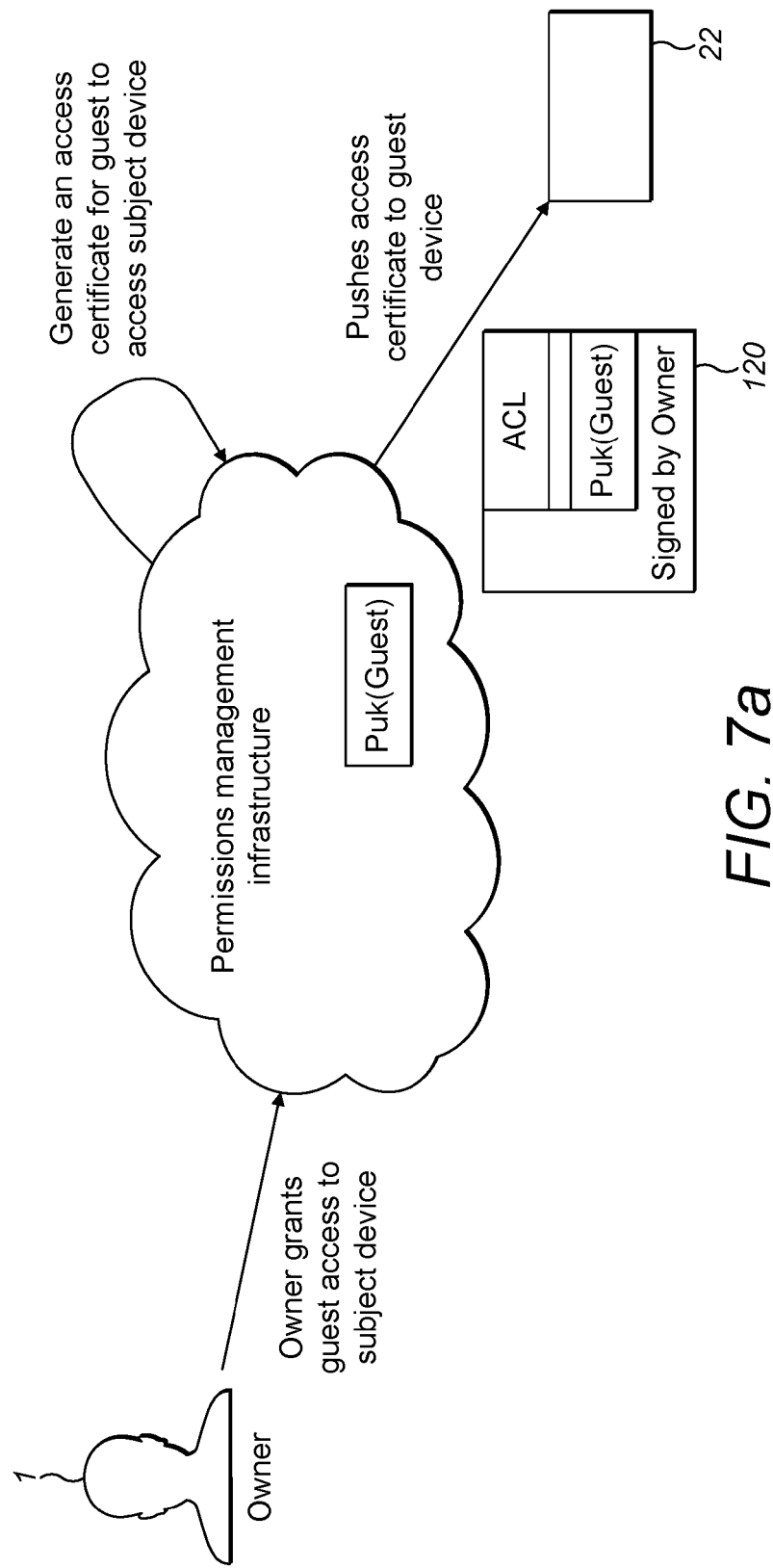
FIG. 7a schematically shows an owner granting permission to the guest data processing device of FIG. 6 to access a subject device using a permissions management infrastructure.
Figure 7B:
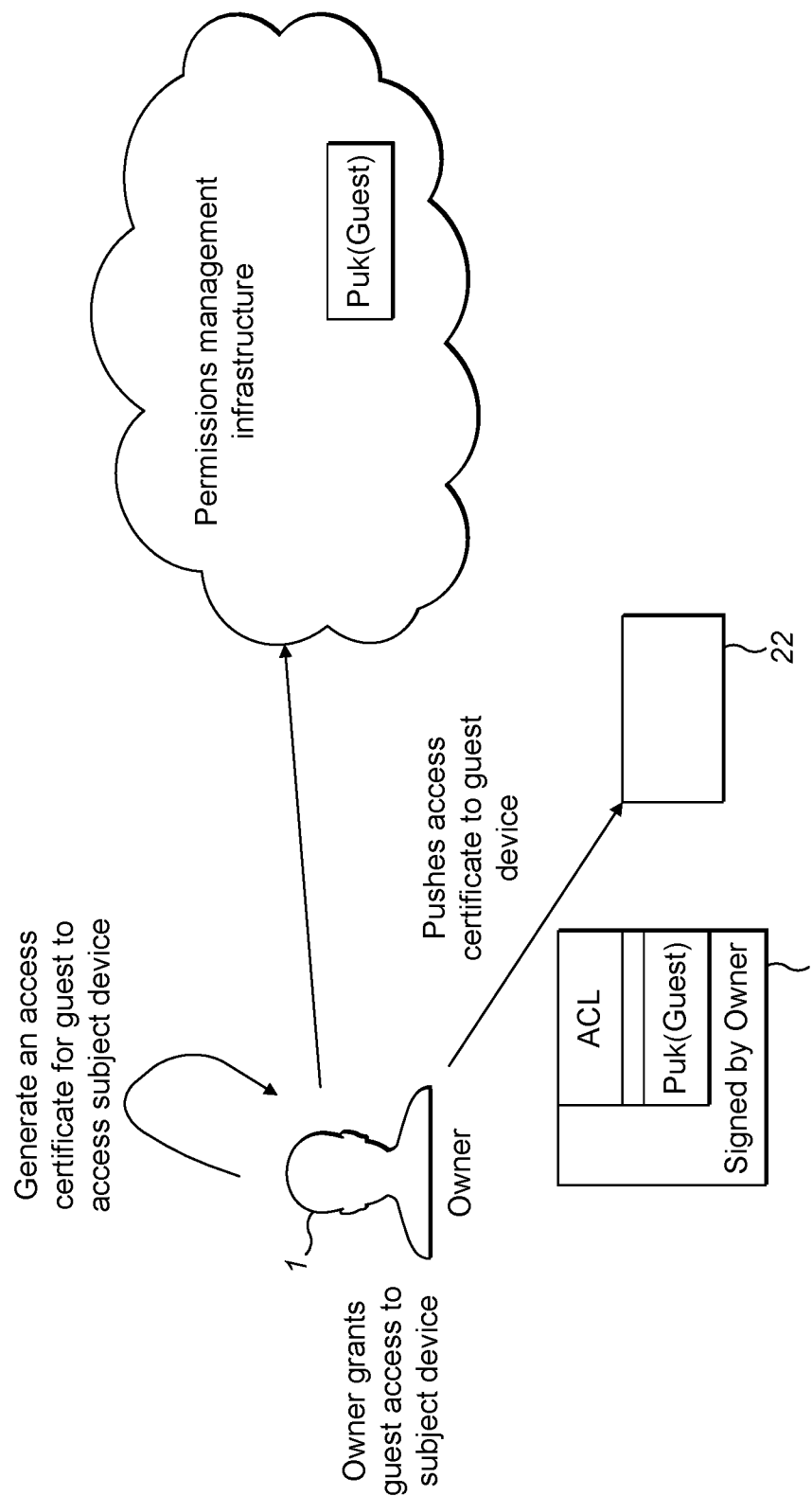
FIG. 7b schematically shows an owner, using the data processing device of FIG. 1, granting permission to the guest data processing device of FIG. 6 to access a subject device.
Figure 8:
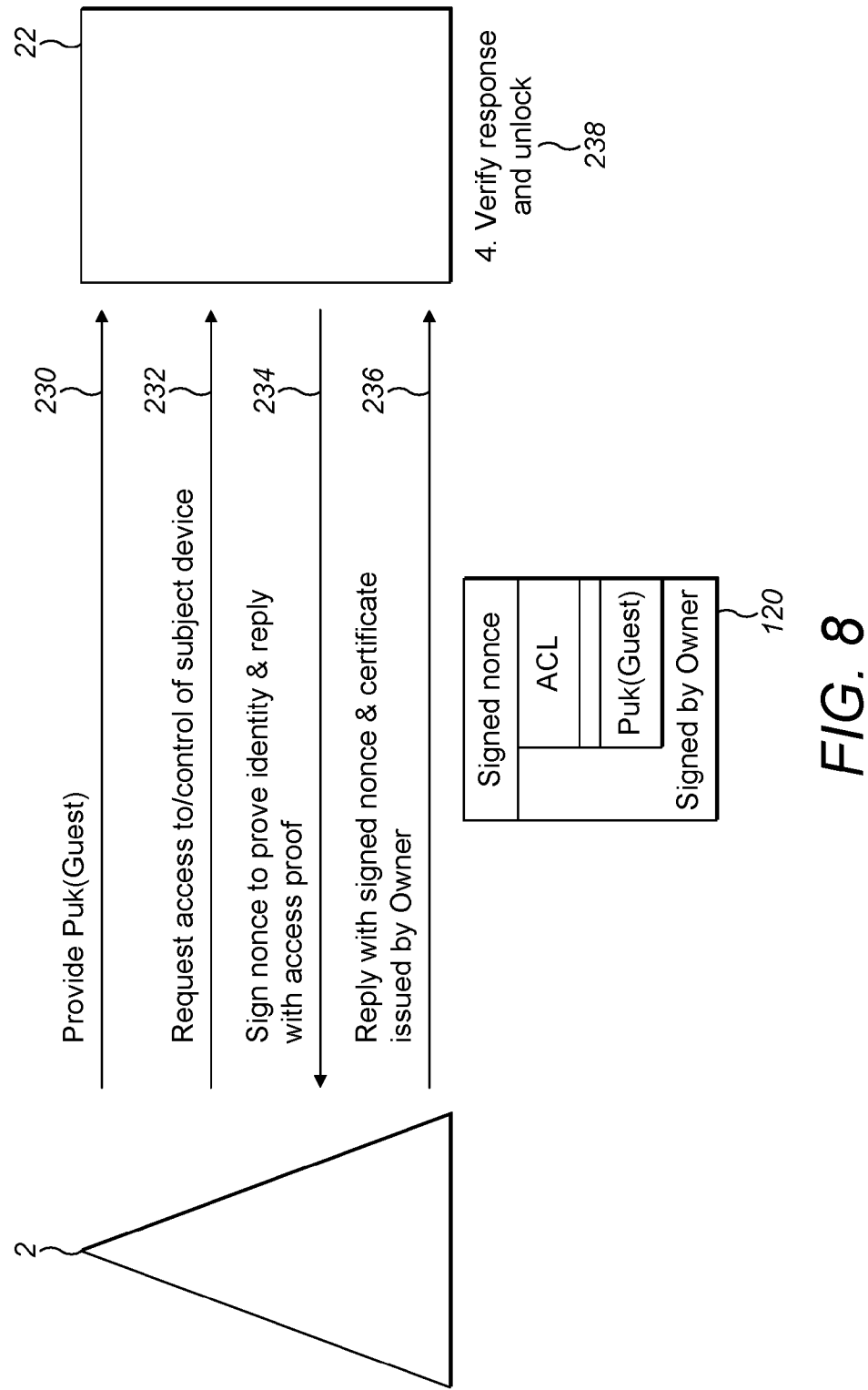
FIG. 8 schematically shows the guest data processing device of FIG. 6 communicating with a subject device.

FIG. 6 shows an example of a guest envoy device 2, hereinafter "guest device" 2 added to the network 100 within the system 99, whereby a guest requests, via the guest device 2, permission to access one or more subject devices (20a-20g or 22) within the network 100. FIG. 7a schematically shows an example of an owner granting permission to the guest to access subject device 22 using permissions management infrastructure, FIG. 7b schematically shows an example of an owner granting permission to the guest to access subject device 22 using envoy device 1, and FIG. 8 schematically shows an example interaction between the guest device 2 and subject device 22.

As with the envoy device 1, it will be appreciated that the guest device 2 may be any suitable data processing device e.g. a smartwatch, smartphone, tablet etc.

In the illustrative example of FIGS. 6 and 7a, the guest requests permission to access subject device 22.

In some examples, the guest device 2 may request permission from the permissions management infrastructure 102 directly e.g. via an application running on the guest device 2 (as depicted by feature 131 FIG. 6).

Alternatively, in some examples, the guest device 2, may request permission from the permissions management infrastructure 102 indirectly via a suitable data processing device such as an owner's envoy device 1 (as depicted by features 132, 133 FIG. 6) or a subject device.

On receiving the request from guest device 2, permissions management infrastructure 102 may request a public key $Puk_{(Guest)}$ from the guest device 2. Alternatively, the guest device 2 may automatically provide the public key $Puk_{(Guest)}$ as part of the request. The guest device 2 may also provide other device identifiers to the permissions management infrastructure, either automatically or on request e.g. unique device identifier (e.g. IPv6 address) and/or device owner identifiers ('Owned by GuestX').

In some examples, the permissions management infrastructure 102 may comprise a database 111, comprising device identifiers associated with data processing devices (e.g. guest devices) which are permitted/prohibited from accessing subject devices. Therefore, the permissions management infrastructure 102 may check the database 111 as to whether the guest device 2 making the request is permitted to access the subject device for which permission is requested.

In some examples, additionally or alternatively to checking the database 111, the permissions management infrastructure 102 may communicate with the owner e.g. via envoy device 1 to verify if the guest device 2 should be permitted to access the subject device 22.

For example, the permissions management infrastructure 102 may communicate with the owner via a user interface (UI) on the envoy device 1 and provide an option to the owner to confirm whether or not permission should be granted to the guest device 2.

For example a proposal communication may be communicated to the envoy device 1 from the IDM 108 and displayed to the owner via the UI, whereby the proposal communication may state:

"Guest device ('Owned by GuestX') requests permission to access subject device 22—Grant permission 'Yes' or 'No'?"

The owner may then respond by providing an input e.g. via a touch input, corresponding to 'Yes' or 'No', which is transmitted as a consent status communication to the permissions management infrastructure 102 e.g. to the IDM 108.

Additionally or alternatively, the owner may also set/limit the permissions for the guest device 2 in the consent status communication e.g. via an application running on the envoy device 1.

As illustratively shown in FIG. 7a, if the owner grants permission to the guest device 2 to access subject device 22 (Step 220), and/or set/limit permissions, the PCE 106 may generate the respective permissions (Step 222), which in the present example comprises an ACL as previously described.

In the present example, the PCE 106 then communicates the ACL to the IDM 108. The IDM 108 combines the guest device's public key $Puk_{(Guest)}$ with the ACL to provide certificate 120 and signs the certificate 120 with a private key $Prk_{(Owner)}$ associated with the owner. The signed certificate 120 is then transmitted to the guest device 2 (Step 224), either directly (as indicated by feature 131 (FIG. 6)) or indirectly e.g. via envoy device 1 (as indicated by features 132 and 133 (FIG. 6)).

As before, the permissions management infrastructure 102 may be provisioned with the private key ($Prk_{(Owner)}$)), e.g. upon registration of the owner with the permissions management infrastructure 102 e.g. using envoy device 1.

In alternative examples (not shown in FIG. 7a), the permissions management infrastructure is not provisioned with the private key $Prk_{(Owner)}$, but, as above, the subject device 22 may be provided with a public key $Puk_{(PMI)}$ of the permissions management infrastructure 102, e.g. during the registration process by the owner. Therefore, the permissions management infrastructure 102, may sign the certificate of 120 with the corresponding private key $Prk_{(PMI)}$.

While in the example illustratively shown in FIG. 7a the permission management infrastructure generates the permissions, in a further example, the owner may, e.g. using the envoy device 1, generate the permissions and transmit the permissions directly to the guest device 2, whereby the guest device 2 may then provide the permissions the subject devices. As such it will be seen that the permissions management infrastructure may comprise the envoy device 1.

Such functionality is illustratively shown in FIG. 7b whereby the owner may, via an application running on the envoy device 1 define permissions for guest device 2, whereby the application may automatically generate certificate 120 comprising ACL locally on the envoy device 1 and sign the certificate with the private key of the owner $Prk_{(Owner)}$. The envoy device 1 may then transmit the signed certificate to the guest device 2. In the present example, as above, the envoy device 1 may be provisioned with the public key $Puk_{(Guest)}$ of the guest device 2.

Using the functionality illustratively shown in FIG. 7b, there is no requirement for the envoy device 1 or guest device 2 to have network connectivity with the permissions management infrastructure to generate permissions, as all permissions may be generated locally on the envoy device 1 and communicated to the guest device 2 using a suitable communications protocol e.g. BLE, Bluetooth and/or ZigBee.

The envoy device 1 may also, when network connectivity is available, transmit a description of the permissions granted to the guest device 2 to the permissions management infrastructure 102 for storage thereat, so the permissions management infrastructure 102 is aware of the generated permissions and/or the guest device 2. Such a description may comprise the signed certificate 120.

FIG. 8 shows an example of the guest device 2, having the signed certificate 120, requesting access to the subject device 22 and being authenticated by the subject device 22.

At step 230, the subject device 22 is provided with the public key $Puk_{(Guest)}$ associated with the guest device 2, which is stored in memory circuitry thereon. Provision of $Puk_{(Guest)}$ at the subject device 22 may occur at any suitable time and may be provided using a suitable communications protocol, by the guest device 2, the envoy device 1 and/or directly or indirectly from the permissions management infrastructure 102 e.g. from IDM 108.

At step 232, the guest device 2 requests access to the subject device 22. At step 234, the subject device 22 transmits a nonce to the guest device 2 in order for the guest device 2 to prove its identity.

At step 236, the guest device 2 signs the nonce with its private key $Prk_{(Guest)}$, which corresponds to public key $Puk_{(Guest)}$ provided to the subject device 22 (Step 230), and transmits the signed nonce and certificate 120 to the subject device 22. In some examples the signed nonce may be combined with certificate 120 (as shown in FIG. 8).

To verify the identity of the guest device 2 the subject device 22 may verify the signed nonce e.g. using $Puk_{(Guest)}$. The subject device 22 may then verify the signed certificate 120 using $Puk_{(Owner)}$ (or $Puk_{(PMI)}$ as appropriate), and, if verified, allow access thereof to the authenticated guest device 2 as specified in the ACL. (Step 238.)

Furthermore, by providing the public key ($Puk_{(Guest)}$) of the guest device 2 in the certificate 120, it may be possible for the subject device 22 to further verify that the guest device sending the certificate is the guest device to which the certificate was actually issued by the IDM 108, e.g. by comparing the public key of guest device in the certificate 102 with the public key provided to the subject device (at step 230).

Using the above described functionality, only guest devices having a certificate signed by an authorized party (e.g. by the owner's envoy device 1 or the permissions management infrastructure 102) will be authenticated and therefore be provided access to subject devices as specified in the ACL.

Furthermore, using the above described functionality, when permissions are provided to the guest device 2 from permissions management infrastructure 102 on the cloud, the guest device 2 would be required to have a network connection to receive the certificate directly from the permissions management infrastructure 102. However, once the certificate is received, the guest device 2 could provide the certificate to the subject device locally e.g. via BLE, whereby the subject device could authenticate the guest device and implement the ACL. Therefore, there is no requirement for the subject device to be constantly connected to a network.

Alternatively, the guest device may receive the certificate indirectly from the permissions management infrastructure 102, e.g. via an owner's envoy device using BLE. The guest device could then provide the certificate to the subject device locally e.g. via BLE, whereby the subject device could authenticate the guest device and implement the ACL. Therefore, there is no requirement for the guest device or the subject device to have a constant network connection.

Furthermore, as above blacklists may be sent to the subject devices directly or indirectly. For example, the blacklists may be communicated to the subject device via a guest device which itself is blacklisted. If, for example, the guest device requests access to a subject device, on receiving the request, the PCE may verify the device attributes of the requesting guest device. The PCE may then generate a certificate comprising a blacklist having the public key of the requesting guest device. The IDM may then encrypt the certificate using the public key of the subject device, sign the certificate using the private key of the permissions management infrastructure (or the owner as appropriate) and send the certificate to the guest device. On receiving the certificate, the guest device can present it to the subject device, which decrypts the certificate, verifies the signature and implements the blacklist, thereby denying access to subject device by the guest device. The guest device will not be aware of the blacklist within the certificate as the certificate will be encrypted.

Using such functionality, it is possible for subject devices to maintain updated blacklists, even if the blacklists are provided to the subject devices by known rogue devices.

Furthermore, the permissions management infrastructure may push certificates comprising ACLs to the subject devices directly or indirectly e.g. via an owner envoy device or via guest device, whereby the subject devices may then authenticate the guest device and check the permissions in the ACL for each guest device locally. In the case the subject devices receive the updated ACLs directly from the permissions management infrastructure, the subject devices would require occasional network connectivity to receive the updated ACLs, while in the case of receiving the ACLs indirectly, only the device receiving the ACL is required to have network connectivity.

It will be appreciated that in some examples, the subject devices may authenticate the guest devices and check the permissions granted to the guest devices by communicating directly with the permissions management infrastructure. For such functionality, the subject devices should have network connectivity at the time of authentication.

Therefore, it will be appreciated that the permissions management infrastructure 102 may generate permissions based on instructions of an owner, or based on requests from a guest (e.g. using PCE 106), while the permissions management infrastructure 102 may manage the generated permissions, and implement the permissions on a data processing device (e.g. guest device, subject device) in communication therewith or via a device associated with the owner (e.g. using the IDM 108).

Figure 9:
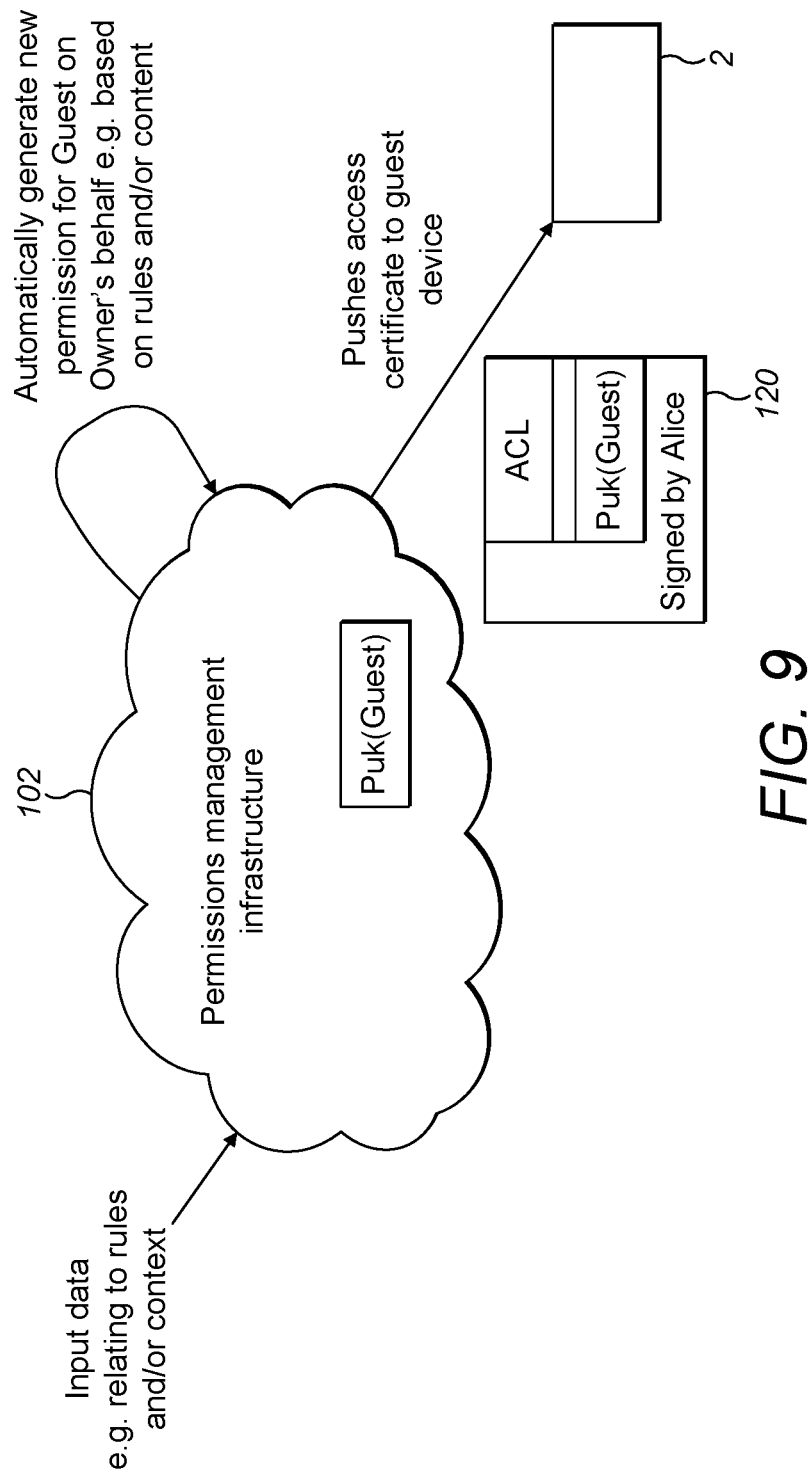
FIG. 9 schematically shows a permissions management resource.

As illustratively shown in the examples at FIGS. 9 and 10, and as described below, the permissions management infrastructure 102 may automatically generate new permissions based on various input data, and further implement the automatically generated permissions on various data processing devices (e.g. subject devices, envoy devices).

The input data may include one or more of the following taken alone or in combination:
- a set of rules/policies defined by an owner to set permissions for an associated subject device(s), whereby the rules/policies may be set by the owner dependent on different use cases;
- guest identity, which may be defined in a guest account associated with permissions management infrastructure or provided in real time by the owner via an owner envoy device; and/or
- contextual information which may be derived for example, from device identifiers associated with subject devices, guest devices, owner devices or other resources on a network.

The owner may create a rule at the permissions management infrastructure 102, whereby the rule is created by the owner e.g. via an application running on the owner's envoy device, and stored in database 111 at the permissions management infrastructure 102.

As an example, a rule/policy which an owner may use to set permissions is an IF: THAT; THEN THAT rule/policy, whereby as an illustrative example with reference to FIG. 10*a*, the rule requires:

IF: permission is granted to a guest device to access a first subject device within a network having a first device identifier for example, a data type identifier='high_sensitive_data' (e.g. entry sensor 20*c*, door lock 20*f*, alarm 20*g*);

THEN: grant permission to the guest device to access all subject devices on the network having the same data type identifier.

In the above example, on being granted permission to access the alarm 20*g*, the guest device will also be permitted to access the entry sensor 20*c* and door lock 20*f*, whereby the PCE 106 will generate the necessary permissions (e.g. as an ACL) and the IDM 108 will communicate corresponding certificates to the guest device to allow it to access the subject devices matching the criteria as before.

Figure 10B:
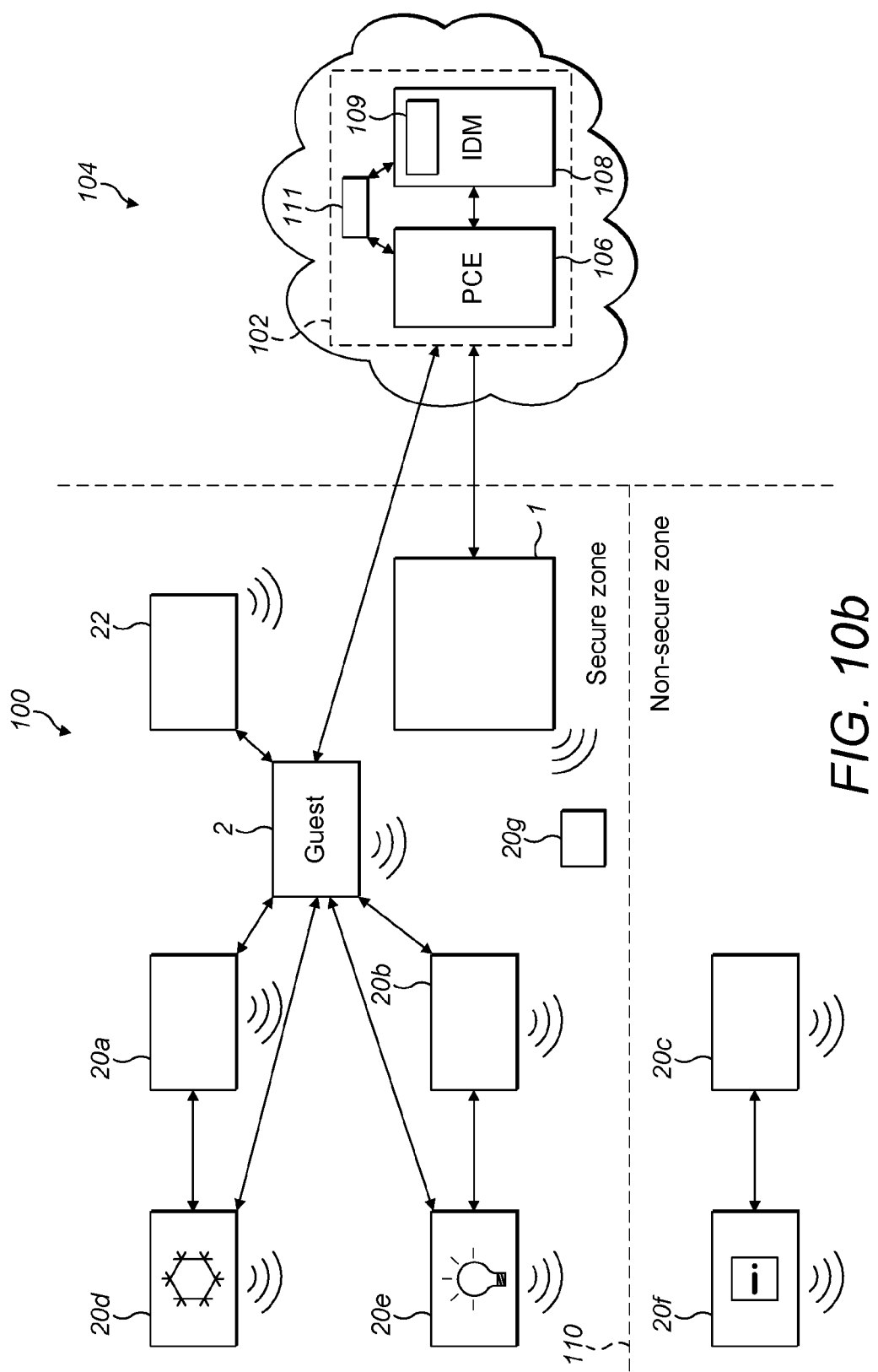
FIG. 10b schematically shows the guest data processing device in a network communicating with a plurality of subject devices.

As a further example of a rule/policy, as illustratively shown in FIG. 10*b*, the owner has one or more subject devices in network 100 which are in the same device class, whereby, for example, device class identifier='household_appliance/' (e.g. temperature sensor 20*a*, light sensor 20*b*, air conditioning unit 20*d*, lightbulb 20*e*), while the owner has further subject devices in the network 100 which are in a different class, whereby device class identifier='security_appliance/' (e.g. entry sensor 20*c*, door lock 20*f*, smart alarm 20*g*).

Therefore, in the above illustrative example, if a guest device 2 is permitted to access the temperature sensor 22, the guest will automatically be permitted to access the temperature sensor 20*a*, light sensor 20*b*, air conditioning unit 20*d*, lightbulb 20*e* as a result of the owner created policy, whereby, for example, the PCE 106 will automatically generate the permissions and the IDM 108 will communicate the corresponding certificate(s) to the guest device 2.

However, the guest device 2 will not automatically be permitted to access the entry sensor, door lock and/or smart alarm as those devices comprise a different device class identifier, and the guest will have to request permission to access those subject devices.

As a further example of a rule/policy, the PCE 106 may be configured to automatically grant permission for a guest device 2 to access all subject devices within a work environment having certain device identifiers (e.g. device class identifier='work_device/') if the owner grants permission to the guest device to enter the work environment e.g. via an entry sensor.

As a further example of a rule/policy, the PCE 106 may be configured to automatically grant permission for a guest device 2 to access all subject devices having the same device class identifiers (e.g. 'household_appliance/') if the owner grants permission to the guest device to access at least one subject device having that device class identifier.

In a further illustrative example of a rule/policy, a lighting system (not shown) comprising a plurality of smart-lights installed in Cambridge city suddenly starts malfunctioning, due to the smart-lights having being compromised by malware such that hackers can control the smart-lights as they wish.

In general, Cambridge city technicians may have permissions to run local maintenance action on the smart-lights (e.g. to detect malware, identify faults) but not the permissions to install software e.g. to reinstall the operating system (OS) or reflash firmware.

An emergency rule set up at the permissions management infrastructure by the owner (e.g. the Cambridge City Council IT team) states that in the case of a subject device being compromised, the city technicians will be granted the necessary permissions to re-install the OS and/or reflash memory e.g. to eliminate local malware.

Therefore, in the present illustrative example, the city technician may indicate that the smart-lights have been compromised (e.g. via an application on the envoy device), and therefore the PCE will automatically generate the permissions to allow all city technicians to install software and transmit the permissions to the technician's envoy device e.g. via the IDM.

The PCE may also blacklist the hacker and create a blacklist of permissions (e.g. as an ACL) comprising details of the hacker (e.g. the network address of the hacker), which can be sent to all subject devices of the owner, e.g. via the permissions management infrastructure to prevent future access to a subject device by the hacker.

Furthermore, the permissions management infrastructure may use information relating to guest identity as input data to automatically generate permissions. As an illustrative example, a guest (Guest D) may register with the permissions management infrastructure associated with an owner of subject devices e.g. by creating a guest account therewith via a web application.

As part of the registration, the guest may provide information relating to the guest identity and identity of any data processing devices associated with the guest to the permissions management infrastructure. Such information may include unique device identifiers and/or public keys of guest devices, which may be stored in database at the permissions management infrastructure.

The owner may then set the permissions associated with the guest identity and the associated guest devices for the various subject devices of the owner. As above, when the permissions are set by the owner, the PCE will generate permissions for the subject devices permitted to be accessed by the guest e.g. as ACLs comprising the unique device identifiers of the guest's data processing devices allowed to access the subject devices. The IDM will then transmit the ACLs to the subject devices directly or indirectly (e.g. as part of a certificate transmitted to the guest's data processing devices).

If a guest obtains a new guest device which is not yet permitted to access a subject device, the guest may communicate device identifiers of the new guest device to the permissions management infrastructure (e.g. unique device identifier, public key of the device and device owner identifier="Device_Owned_by_Guest D)

On receiving the device identifiers as input data, the PCE 106 may automatically generate permissions for the new guest device to allow the guest access, through the new guest device, all subject devices which he was previously permitted to access by the owner.

Alternatively, the owner may set a rule/policy which states that any new guest devices belonging to the guest will be provided with the same permissions as the guest's existing devices.

The PCE may, for example using a machine learning algorithm (e.g. regression analysis), automatically generate permissions for guest devices and/or subject devices based on contextual information which may be derived from communications from subject devices, guest devices, owner devices within a network, or extracted from a database and used as input data.

For example, the device identifiers of subject devices and/or guest devices may provide contextual information e.g. where the device is located, who owns the device, what type of device does the owner intend to use the device as e.g. household appliance/security appliance. Such device identifiers, may be communicated to the permissions management infrastructure by each of the subject devices directly or indirectly and stored within a database thereat.

In an illustrative example, the PCE may recognise that an owner repeatedly sets the same permissions for subject devices having identical device identifiers within a certain location. Therefore, the PCE may be configured to automatically generate the same permissions for any new subject devices having the same device identifiers within the same area.

As an illustrative example, an owner may purchase a temperature sensor subject device, turn it on e.g. within the secure zone of network.

As described above, when turning the temperature sensor on, the owner would use an owner envoy device to interact with the temperature sensor to, take ownership thereof and discover device identifiers and/or set the device identifiers and transmit the device identifiers to the permissions management infrastructure. In the present example the device identifiers may include (device class identifier=sensor), (device location identifier=secure_zone).

The PCE would analyse the device identifiers provided by the envoy device and automatically generate permissions using the device identifiers and any contextual information as input data.

In a further illustrative example, as generally depicted in FIG. 10b, a new subject device is a temperature sensor 22 and is located within the secure zone of the network 100, comprising other subject devices 20a and 20b having identical device class identifiers, which are permitted, by the owner, to publish operational data to a website which can be accessed by the owner's family & friends.

Therefore, because the owner has previously added other subject devices having identical device class identifiers in the secure zone which publish operational data to a website which can be accessed by the owner's family & friends, the PCE 106 will automatically generate permissions (e.g. as an ACL) for the new temperature sensor 22 to allow it to publish operational data to the website which can be accessed by the owner's family and friends.

The IDM 108 may be used to manage implementation of the permissions on the new subject device, including obtaining owner consent to apply any automatically created permission by sending a proposal communication to owner e.g. via the owner's envoy, and managing the distribution of the permission to the subject device based on whether consent is received from the owner e.g. as a consent status communication. As before, the IDM 108 may upload permission to the new subject device 22 directly or indirectly e.g. via the owner's envoy device.

As a further illustrative example of using contextual information to generate permissions, a technician 'Mr Y' from 'Company A' installs a subject device comprising a smoke alarm in a clean room having a security level=1, within a maximum security building. The technician, takes ownership of the smoke alarm via an envoy device and sets the device identifiers accordingly, and communicates the device identifiers to the PCE.

As the subject device is a smoke alarm located in a clean room having an associated security level of 1, within a maximum security building, the PCE will use the device identifiers set by the technician as input data and automatically generate a permission based on the context derived from the device identifiers.

Therefore, an example permission may be that the smoke alarm may only be locally accessed by a specific category of technician, for example by technicians being able to demonstrate Clean room 1 technician status e.g. by having a certificate signed with a Private key corresponding to such technicians, or, for example using an envoy device having a device identifier listed within an ACL on the smoke alarm. A further permission may be that the smoke alarm is to be accessible to certain external parties, e.g. by SCADA1 system.

The IDM may then push the permission to 'MR Y's' envoy device which, in turn, pushes the permission to the smoke alarm detector for implementation thereon.

An owner may also update permissions for subject devices/guest devices at the permissions management infrastructure.

Therefore, for example, if a guest device has existing permissions to access a subject device, and the guest device enters the proximity of the subject device, then the guest device may be configured to automatically check with the permissions management infrastructure as to whether there are any updates to the existing permissions, and the IDM can push any updated permissions to the guest device or to the subject device.

As an illustrative example, if a guest device is permitted to access features on a subject device e.g. for N days, then after N days pass, the guest device may automatically check with the permissions management infrastructure if there are any updated permissions for the guest device e.g. to extend the permissions.

If there are updated permissions e.g. if the owner has agreed to extend the permissions or if the PCE 106 has automatically created permissions, the IDM 108 can automatically push the updated permissions to the guest device. Such updated permissions may be set by the owner, and stored within a database 111.

Furthermore, an owner may modify the permissions associated with certain subject devices, e.g. the owner may change the location that a subject device is to publish data to and/or may prohibit certain guest devices accessing the subject devices. The modified permissions may then be transmitted to the permissions management infrastructure 102.

On receiving the updated permissions, the PCE may generate updated ACLs having the updated permissions and the IDM will manage the distribution accordingly. If the IDM cannot communicate the updated permissions to the subject device directly or indirectly, e.g. due to lack of connectivity, the permissions may be stored in the database until connectivity becomes available.

Therefore, if an owner enters the proximity of a subject device with an envoy device 1, the envoy device may check with the permissions management infrastructure as to whether there are any updated permissions for the subject device, and the IDM may push the updated permissions in the database to the envoy device, which in turn will push the updated permissions to the subject device e.g. via BLE.

Therefore, it will be appreciated that the subject devices are not required to be connected to the cloud to receive updated permissions, but can receive permissions via various data processing devices in proximity thereto (e.g. guest devices and/or owner envoy devices etc.).

As before after taking ownership of a subject device, the owner may transmit a description of ownership to the permissions management infrastructure, whereby the description of ownership may comprise the device identifiers of the subject device.

In further examples, the owner may, for example using an application running on the owner envoy device, create groups into which subject devices may be classified, whereby each of the groups may have associated rules at the permissions management infrastructure as defined by the owner. As above the PCE may automatically generate access permissions depending on the defined rules, and the IDM may distribute the permissions accordingly.

For example, the owner may create a 'private' group, and further create a rule at the permissions management infrastructure whereby subject devices classified as being within the 'Private' group are to be inaccessible to data processing devices other than those belonging to the owner.

As a further example, the owner may define a 'public' group, and further create a rule whereby subject devices classified as being within the 'Public' group are accessible by any data processing device whatsoever.

It will be appreciated that the owner may define further groups and define any associated rules dependant on the requirements of the particular owner. For example, such groups may include, a 'Friends' group, a 'Family' group, an 'Employees of Company X' group, 'Temporary Employees group' etc.

In order to determine which data processing devices are classified as falling within any particular group, the permissions management infrastructure may communicate with a remote resource such as a remote directory service e.g. an address book on the owner's mobile device, a server database, and/or a web application to identify such data processing devices e.g. by device identifiers listed in the directory (e.g. a device owner identifier).

Using such functionality the permissions management infrastructure may readily generate permissions for multiple subject devices and transmit the permissions to multiple guest devices, whereby, for example, the PCE may be used to generate the permissions, and the IDM used to distribute the permissions to the appropriate devices.

Figure 11A:
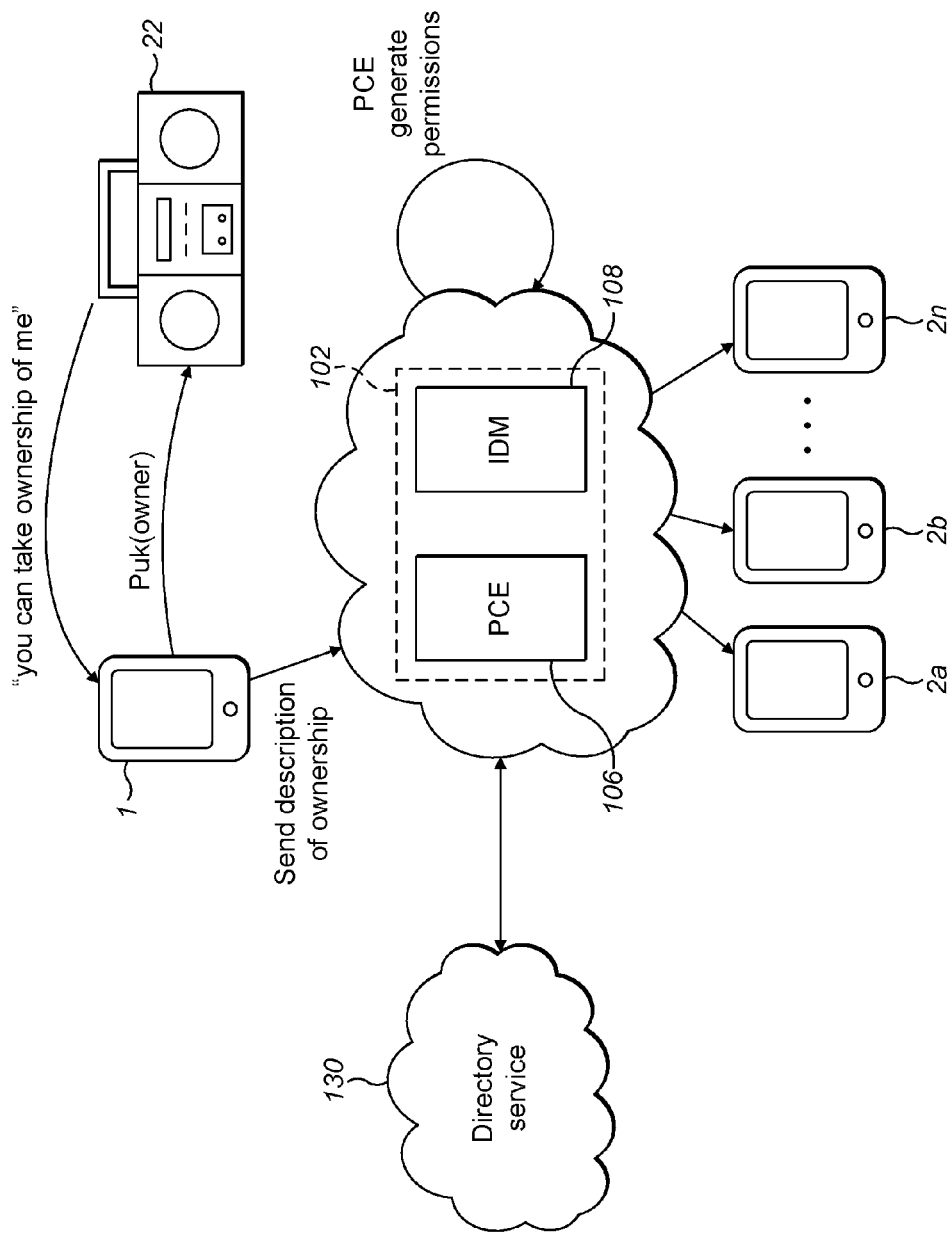
FIG. 11a schematically shows a plurality of data processing devices in a network communicating with a permission management infrastructure.

As an illustrative example of such functionality, FIG. 11*a* shows an example of an owner taking ownership of a new subject device 22, which in the present example is depicted as a music player 22. As above the ownership procedure may be undertaken by transmitting the owner's public key $Puk_{(Owner)}$ to the music player 22 from the owner's envoy device 1.

In the present example, the owner defines a 'Friends' group at the permissions management infrastructure e.g. via an application on the envoy device 1, and further defines a rule that any data processing devices belonging to a friend e.g. via an envoy device owned by a friend, hereinafter "friend device", is permitted to access the music player 22.

In order to determine which devices are classified as a friend device, the permissions management infrastructure 102 communicates with remote directory service 130, which in the present example is a web application comprising a list of all the owner's friends and their associated friend devices 2*a*-2*n*.

The PCE 106 may automatically generate permissions for all friend devices, and the IDM 108 may automatically communicate the permissions to each of the friend device 2*a*-2*n*.

Using such functionality, all the owner's friends may via their respective friend device 2*a*-2*n* access the music player 22 as described above, and, for example control which music is played by the music player 22, and listen to the tunes played on the music player 22.

Using such functionality, it is also possible to blacklist one or more devices within a group. In an illustrative example, FIG. 11*b* schematically illustrates an example of an owner blacklisting a friend device 2*b*.

Figure 11B:
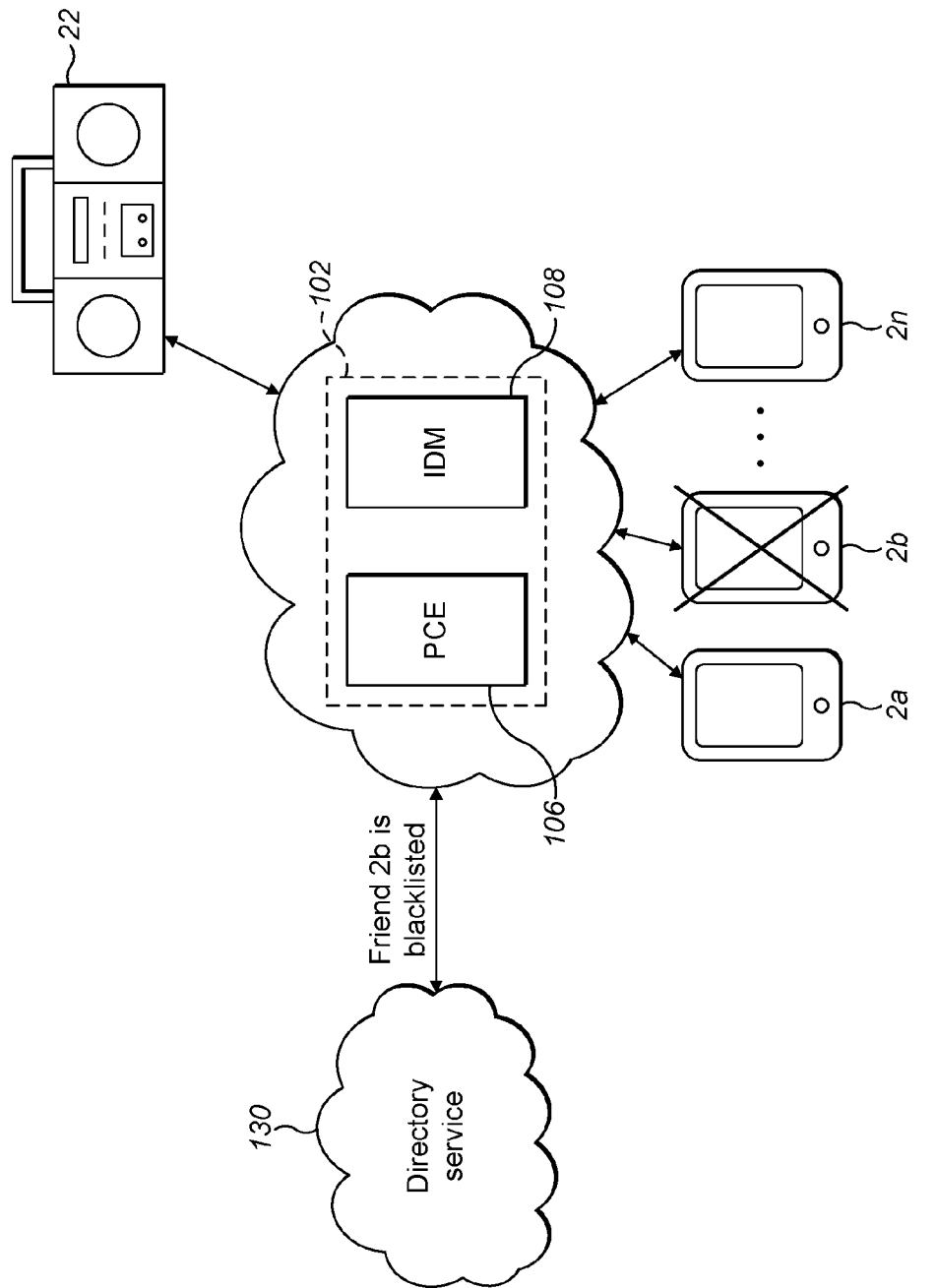

In FIG. 11*b*, friend device 2*b* is blacklisted by the owner, whereby the friend is removed from the friends list. As such the owner notifies the permissions management infrastructure 102, e.g. via an application on the envoy device 1.

In an alternative example, the permissions management infrastructure may periodically check with the remote directory service 130 as to whether there are any updates to the group.

The PCE 106 may then notify the music player 22 of the change in permissions, e.g. by pushing an updated ACL comprising the blacklisted device identifier (e.g. the public key of the friend device 2*b*) to the music player 22. Therefore, any request to access the music player by friend device 2*b* will be denied.

Using such functionality, permissions to specific devices within user defined groups may be easily revoked, while without revoking permissions for all devices within the group.

While the PCE and IDM are shown to be discrete elements within the permissions management infrastructure above, it will be appreciated that the PCE and IDM may be implemented using any suitable configuration.

For example the PCE and IDM may be provided as part of the same processing engine running on a single server. Alternatively, the PCE and IDM may be implemented as different data processing engines running on the same server or the PCE and IDM may be implemented as processing engines on remote servers in communication with each other.

It will be appreciated also that while the figures above generally depict the subject devices as being within a local network in a home environment, the subject devices are not required to be located in a home or work environment, and may be distributed in any network configuration as required by the owner e.g. throughout a building, a business park, a town, a country, a continent or worldwide. Furthermore, there is no requirement for the subject devices to be within the same network.

It will be appreciated that an owner is taken to be a party authorized to access the subject devices and may be a single party or an owner may comprise multiple parties. For example, an owner may be a homeowner having the subject devices in his/her home. Alternatively, the owner may be a team of employees of a business which legally owns the subject devices, whereby, for example, the team of employees interact with the subject devices on behalf of the legal owner.

Although illustrative embodiments have been described in detail herein with reference to the accompanying drawings, it is to be understood that the embodiments are not limited to those precise embodiments, and that various changes and modifications can be effected therein by one skilled in the art without departing from the scope of the embodiments as defined by the appended claims.

According to a first aspect there is provided a method of creating, at a permissions management resource, access permissions relating to a subject device for at least one data processing device, the method comprising: obtaining, at the permissions management resource, input data; generating, at the permissions management resource, at least one permission relating to accessing the subject device in response to the input data; transmitting, from the permissions management resource to the subject device or the at least one data processing device, a communication comprising the at least one permission.

The input data may comprise permissions set by an authorized party and/or the input data may comprise at least one of: a rule/policy defined by an authorized party; a device attribute of the at least one data processing device; a device attribute of the subject device, and/or contextual information.

The input data may comprise classification data relating to the subject device, wherein the classification data may relate to a group within which the subject device is classified by the authorized party.

The method may further comprise: generating, at the permissions management resource, a communication comprising a request for at least one device attribute associated with the group; transmitting the communication comprising the request to a remote directory service; receiving, at the permissions management resource from the remote directory service, the device attribute relating associated with the group.

Generating at least one permission in response to the input data may comprise: automatically generating the at least one permission at the permissions management resource; transmitting, from the permissions management resource, a permission proposal communication to an authorized party, wherein the permission proposal communication may comprises data relating to the automatically created at least one permission; receiving at the permissions management resource, a consent status communication in response to the permission proposal communication and transmitting the communication comprising the at least one permission to the subject device is based on the consent status communication.

Transmitting the communication comprising the at least one permission may comprise transmitting the communication directly or indirectly to the subject device or the at least one data processing device.

The at least one permission may comprise a certificate and/or an access control list, wherein the certificate may further comprise a credential associated with the at least one data processing device, wherein the credential associated with the data processing device may comprise a first cryptographic key, wherein the first cryptographic key may be associated with the at least one data processing device, wherein the first cryptographic key may comprise a public key of the at least one data processing device.

The certificate may further comprise a credential associated with an authorized party, wherein the credential associated with the authorized party may comprise a second cryptographic key, wherein the second cryptographic key may be associated with the authorized party, wherein the second cryptographic key may comprise a private key of the authorized party.

The method further may further comprise: generating, at the permissions management resource, a blacklist of permissions; transmitting, from the permissions management resource, a communication comprising the blacklist of permissions to the subject device.

In a further aspect there is provided a permissions management resource for creating permissions relating to a subject device, the permissions management resource comprising: a permission creation engine configured to generate permissions based on input data; and an identity management engine configured to manage the permissions generated at the permission creation engine and to communicate the permissions to the subject device or at least one data processing device directly or indirectly.

The input data may be set by an authorized party, wherein the input data may comprise at least one of: a rule/policy defined by an authorized party; a device attribute of at least one data processing device; a device attribute of the subject device, and/or contextual information, wherein the permission creation engine may be configured to automatically generate the permissions based on the input data.

The method may comprise: generating, at the data processing device, a request communication comprising a request to access the subject device; transmitting, from the data processing device to a permissions management resource, the request communication; receiving, at the data processing device, from the permissions management resource, a permissions communication comprising at least one permission relating to the subject device in response to the request communication.

Transmitting the request communication may comprise, transmitting the request communication directly or indirectly to the permissions management resource.

Receiving the permissions communication may comprise, receiving the permissions communication directly or indirectly from the permissions management resource.

The method may further comprise: transmitting, from the data processing device to the subject device, the at least one permission.

The at least one permission may comprise a certificate, wherein the certificate may comprise a credential associated with a resource authorized by the subject device and/or wherein the certificate may comprise a credential associated with the data processing device and/or wherein the certificate may comprise an access control list.

The method may further comprise: receiving, at the data processing device from the permissions management resource, a blacklist of permissions and transmitting, from the data processing device to the subject device, the at least one permission.

In a further aspect there is provided a method of claiming ownership of a subject device, the method comprising: receiving, at the subject device, a communication comprising a credential from a resource remote therefrom; storing, within storage circuitry at the subject device, the credential; and associating the credential with an owner of the subject device.

The remote resource may comprise a data processing device associated with the owner and/or the remote resource may comprise a permissions management resource.

The credential may comprise a cryptographic key.

The invention claimed is:

1. A method of creating, at a permissions management resource, a permission for a subject device, the method comprising:
    receiving, at the permissions management resource from a data processing device, a request to access a function or feature of the subject device;
    determining, at the permissions management resource, based on input data comprising a rule or policy stored at the permissions management resource defining whether the data processing device is authorized to access the function or feature of the subject device;
    generating, at the permissions management resource, the permission in accordance with the rule or policy wherein the permission comprises an access control list which is cryptographically signed by the permissions management resource with a signature verifiable by the subject device, the access control list defining one or more functions or features of the subject device which the data processing device is authorized to access, and wherein the permission further comprises a first cryptographic key associated with the data processing device;
    generating, at the permissions management resource, a blacklist which is cryptographically signed by the permissions management resource with a signature verifiable by the subject device, the blacklist defining one or more functions or features prohibited to be performed by the subject device; and
    transmitting, from the permissions management resource to the subject device the permission and the blacklist to allow the subject device to provide the data processing device with access to one or more functions or features thereof in accordance with the permission and the blacklist.

2. The method according to claim 1, wherein the input data further comprises permissions set by an authorized party; a device attribute of the at least one data processing device; a device attribute of the subject device, and/or contextual information.

3. The method according to claim 2, wherein the input data further comprises classification data relating to the subject device, wherein the classification data relates to a group within which the subject device is classified by the authorized party.

4. The method according to claim 3, the method further comprising:
    generating, at the permissions management resource, a communication comprising a request for at least one device attribute associated with the group;
    transmitting the communication comprising the request to a remote directory service; and
    receiving, at the permissions management resource from the remote directory service, the device attribute relating associated with the group.

5. The method according to claim 1, wherein generating the permission in response to the input data comprises:
    automatically generating the permission at the permissions management resource.

6. The method according to claim 5, the method further comprising:
    transmitting, from the permissions management resource, a permission proposal communication to an authorized party, wherein the permission proposal communication comprises data relating to the automatically created permission.

7. The method according to claim 1, wherein:
    transmitting the communication comprising the permission comprises transmitting the communication directly or indirectly to the subject device or the at least one data processing device.

8. The method according to claim 1, wherein the first cryptographic key comprises a public key of the data processing device.

9. The method according to claim 8, wherein the permission further comprises a certificate associated with the data processing device, the certificate comprises a further credential, the further including a credential associated with an authorized party.

10. The method according to claim 9, wherein the further credential comprises a second cryptographic key, wherein the second cryptographic key is associated with the authorized party.

11. The method according to claim 10, wherein the second cryptographic key comprises a private key of the authorized party.

12. A permissions management resource system for creating a permission for a subject device, the permissions management resource system comprising:
    a processor and a memory operably coupled to the processor;
    instructions that, when executed on the processor, cause the processor to implement:
    a data processing engine comprising a permission creation engine to determine based on input data comprising a rule or policy stored in a database at the permissions management resource whether a data processing device for which permission to access a function or feature of a subject device is requested is authorized to access the function or feature;
    generate a permission in accordance with the rule or policy, wherein the permission comprises an access control list cryptographically signed with a signature verifiable by the subject device; the access control list defining one or more functions or features of the subject device which the data processing device is authorized or prohibited to access, and wherein the permission further comprises a cryptographic key associated with the data processing device;
    generating a blacklist in accordance with the rule or policy, wherein the blacklist is cryptographically signed by the permissions management resource with a signature verifiable by the subject device, the blacklist defining one or more functions or features prohibited to be performed by the subject device; and
    an identity management engine to transmit the permission and the blacklist to the subject device to allow the subject device to provide the data processing device with access to one or more functions or features thereof in accordance with the permission and the blacklist.

13. The permissions management resource system according to claim 12, wherein the input data is set by an authorized party.

14. The permissions management resource system according to claim 13, wherein the permission creation engine is configured to automatically generate the permissions based on the input data.

15. A non-transient computer readable medium including executable instructions which, when executed, configure one or more processors to:
receive, at a permissions management resource from a data processing device, a request to access a function or feature of a subject device;
determine, at the permissions management resource, based on, input data comprising a rule or policy stored at the permissions management resource defining whether the data processing device is authorized to access the function or feature of the subject device;
generate, at the permissions management resource, a permission in accordance with the rule or policy wherein the permission comprises an access control list which is cryptographically signed by the permissions management resource with a signature verifiable by the subject device, the access control list defining one or more functions or features of the subject device which the data processing device is authorized to access, and wherein the permission further comprises a cryptographic key associated with the data processing device;
generating, at the permissions management resource, a blacklist which is cryptographically signed by the permissions management resource with a signature verifiable by the subject device, the blacklist defining one or more functions or features prohibited to be performed by the subject device; and
transmitting, from the permissions management resource to the subject device the permission and the blacklist to allow the subject device to provide the data processing device with access to one or more functions or features thereof in accordance with the permission and the blacklist.

16. The non-transient computer readable medium according to claim 15, wherein the input data further comprises permissions set by an authorized party; a device attribute of the at least one data processing device; a device attribute of the subject device, and/or contextual information.

17. The non-transient computer readable medium according to claim 16, wherein the input data further comprises classification data relating to the subject device, wherein the classification data relates to a group within which the subject device is classified by the authorized party.

* * * * *